US009556964B2

(12) United States Patent
Fima

(10) Patent No.: US 9,556,964 B2
(45) Date of Patent: Jan. 31, 2017

(54) GRAVITY DRAIN VALVE

(71) Applicant: NWS EUROPA GmbH, Hunenberg (CH)

(72) Inventor: Giovanni Fima, Austin, TX (US)

(73) Assignee: NWS Europa GMBH, Hunenberg (CH)

( * ) Notice: Subject to any disclaimer, the term of this patent is extended or adjusted under 35 U.S.C. 154(b) by 0 days.

(21) Appl. No.: 14/683,032

(22) Filed: Apr. 9, 2015

(65) Prior Publication Data
US 2015/0300511 A1  Oct. 22, 2015

Related U.S. Application Data

(60) Provisional application No. 61/995,846, filed on Apr. 22, 2014.

(51) Int. Cl.
*F16K 15/14* (2006.01)
*E03C 1/298* (2006.01)
*E03D 13/00* (2006.01)

(52) U.S. Cl.
CPC ............ *F16K 15/148* (2013.01); *E03C 1/298* (2013.01); *E03D 13/007* (2013.01)

(58) Field of Classification Search
CPC ....... E03C 1/298; E03D 13/007; F16K 15/148
USPC .......... 137/362, 493.9, 512, 512.1, 852, 854
See application file for complete search history.

(56) References Cited

U.S. PATENT DOCUMENTS

| 1,104,869 A | 7/1914 | Bowser |
| 1,211,283 A | 1/1917 | Butler et al. |
| 2,211,212 A | 8/1940 | Langdon |
| 2,554,053 A | 5/1951 | Hyer et al. |
| 2,869,727 A | 1/1959 | Howe et al. |
| 2,912,999 A | 11/1959 | Kersh |
| 3,397,719 A | 8/1968 | Ortheil et al. |
| 4,180,875 A | 1/1980 | Wilson |
| 4,222,407 A | 9/1980 | Ruschke et al. |
| 4,354,492 A | 10/1982 | McPhee |
| 4,556,086 A | 12/1985 | Raines |
| 4,935,129 A | 6/1990 | Wang |
| 5,285,816 A | 2/1994 | Herlihy |

(Continued)

FOREIGN PATENT DOCUMENTS

| EP | 2427677 A1 | 3/2012 |
| EP | 2589716 A1 | 5/2013 |

(Continued)

OTHER PUBLICATIONS

Notification of Transmittal, the International Search Report and the Written Opinion of the ISA, mailed Dec. 22, 2015, from corresponding International Application PCT/US2015/026690, 19 pgs.

*Primary Examiner* — Mary McManmon
*Assistant Examiner* — Nicole Wentlandt
(74) *Attorney, Agent, or Firm* — Young Basile Hanlon & MacFarlane, P.C.

(57) ABSTRACT

A drain valve device includes a drain valve housing arranged to be located within a drain opening. The housing has a wall structure surrounding an axis so as to define an internal flow passage through the housing and a strut member depending radially inwardly from the wall structure. The device has one or more valve members. A gas vent passage may be provided in the housing and a vent valve or control member may be provided to selectively prevent flow through the gas vent passage.

26 Claims, 19 Drawing Sheets

(56) References Cited

U.S. PATENT DOCUMENTS

| | | | |
|---|---|---|---|
| 5,301,709 | A | 4/1994 | Gasaway |
| 5,521,000 | A | 5/1996 | Owens |
| 5,931,197 | A | 8/1999 | Raftis et al. |
| 6,098,656 | A | 8/2000 | Farina |
| 6,273,124 | B1 | 8/2001 | Huber et al. |
| 6,283,147 | B1 | 9/2001 | Rosseel |
| 6,318,397 | B1 | 11/2001 | Huber et al. |
| 6,367,505 | B1 | 4/2002 | Raftis et al. |
| 6,401,266 | B1 | 6/2002 | Mitchell et al. |
| 6,575,190 | B1 | 6/2003 | Rosseel et al. |
| 6,626,201 | B1 | 9/2003 | Kim |
| 6,719,004 | B2 | 4/2004 | Huber et al. |
| 6,795,987 | B2 | 9/2004 | Cornwall |
| 7,900,288 | B2 * | 3/2011 | Fima ................ C02F 1/325 4/287 |
| 2008/0050625 | A1 * | 2/2008 | Kaimann ............ F16K 1/22 429/414 |
| 2011/0016619 | A1 * | 1/2011 | Keller ................ E03D 9/00 4/222 |
| 2012/0167295 | A1 | 7/2012 | Fima |
| 2013/0167952 | A1 * | 7/2013 | Mattson ............ F16K 37/0008 137/551 |
| 2013/0305441 | A1 | 11/2013 | Williamson et al. |
| 2014/0352044 | A1 | 12/2014 | Goldsmith |

FOREIGN PATENT DOCUMENTS

| | | |
|---|---|---|
| GB | 2329332 A | 3/1999 |
| GB | 2481921 A | 1/2012 |
| WO | 2010129531 A1 | 11/2010 |

* cited by examiner

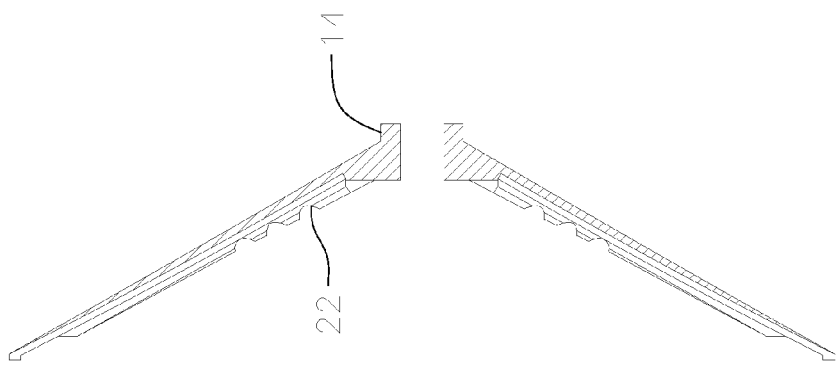
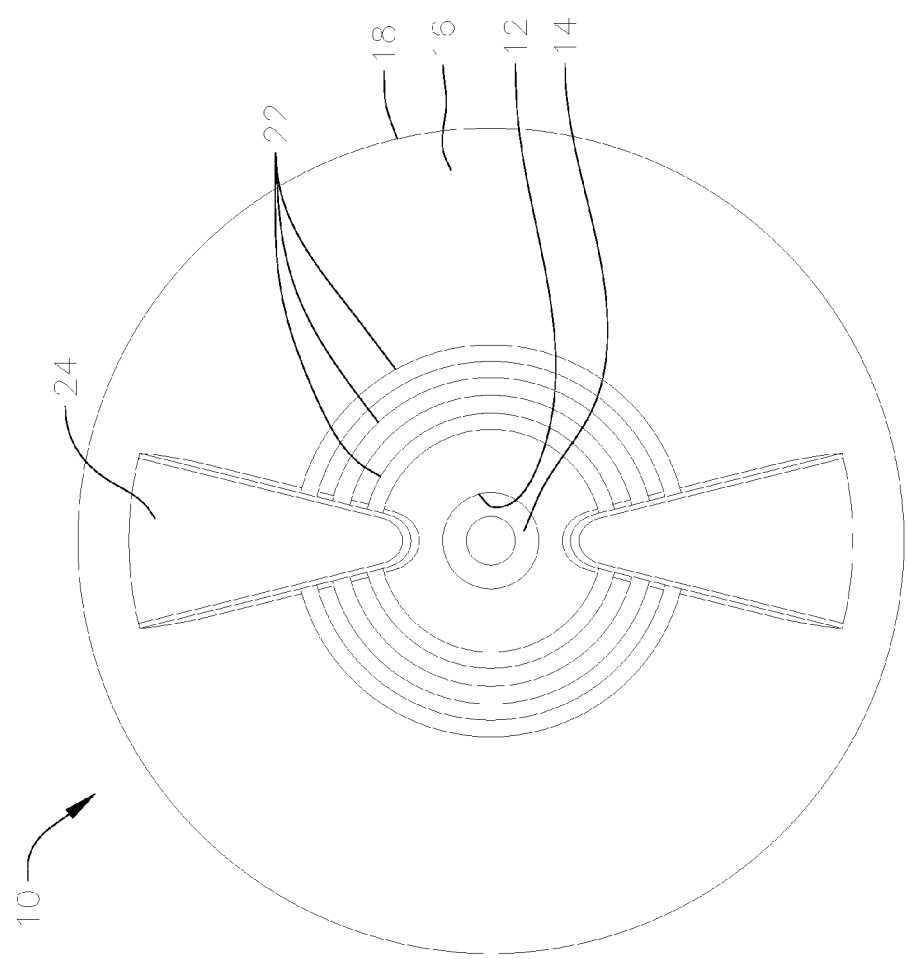

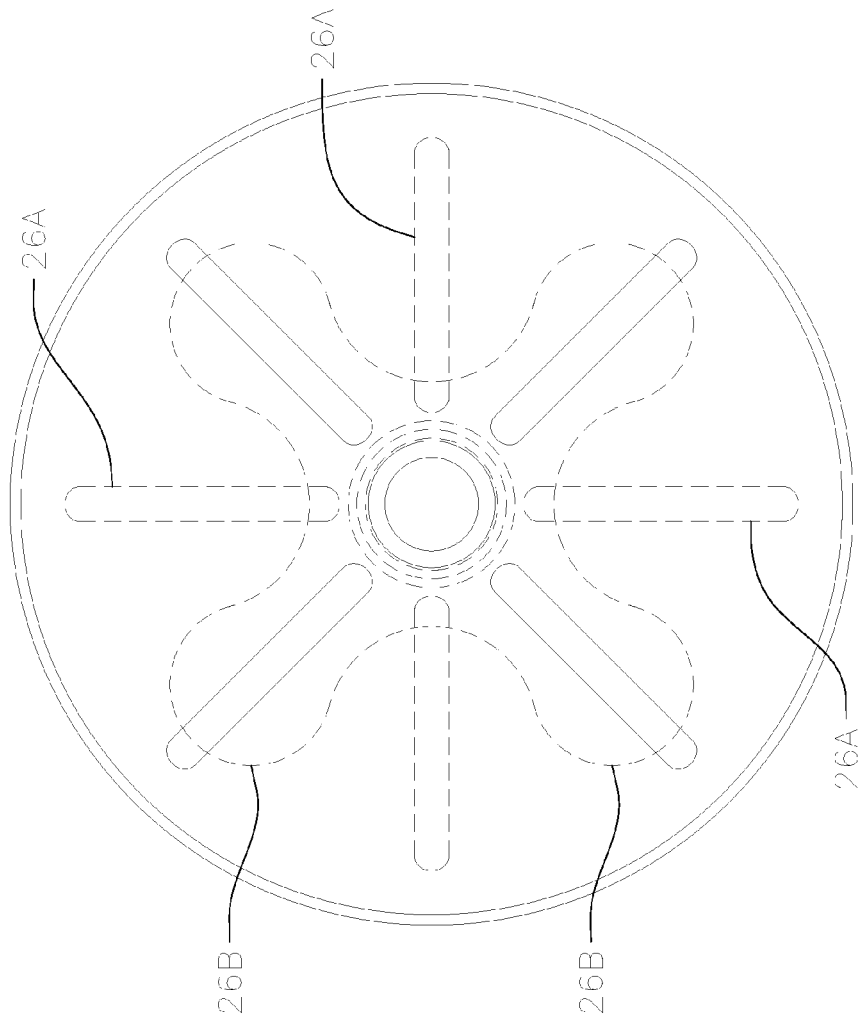
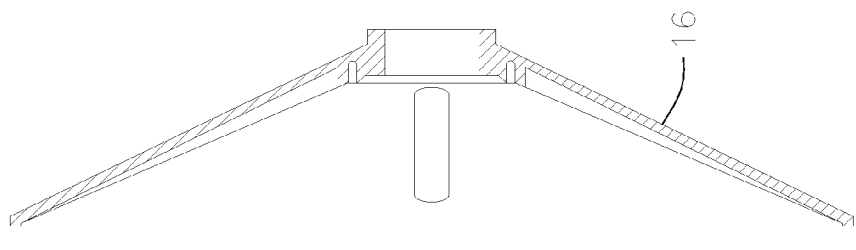

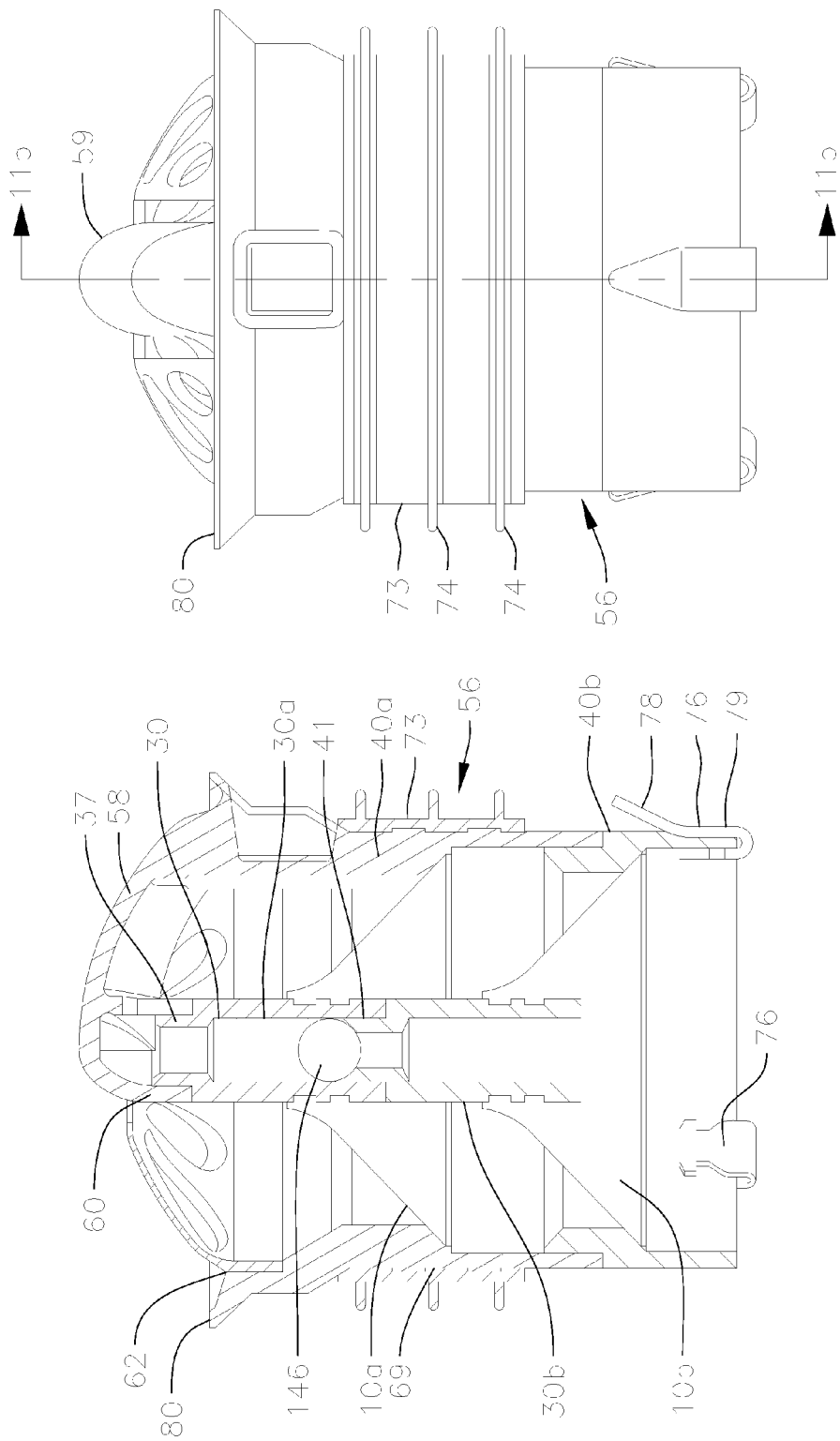

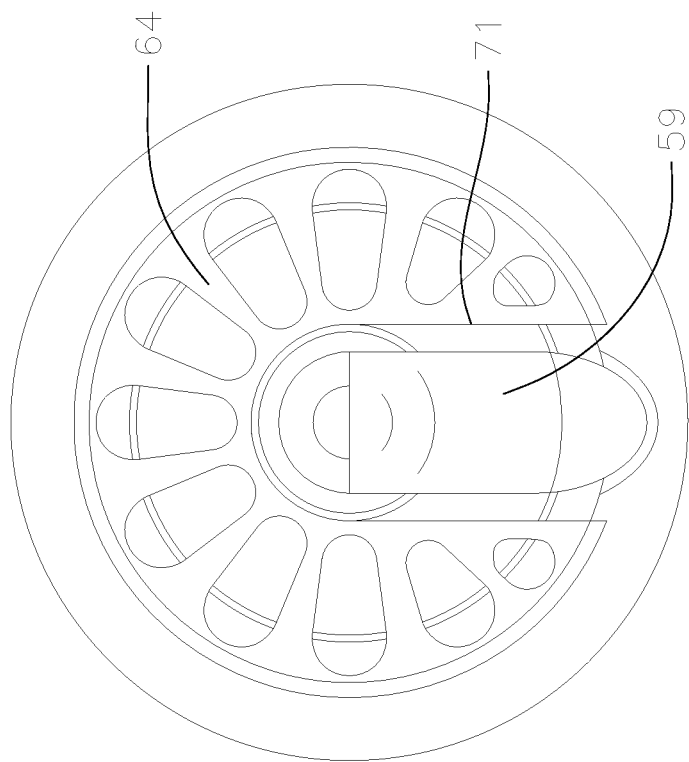

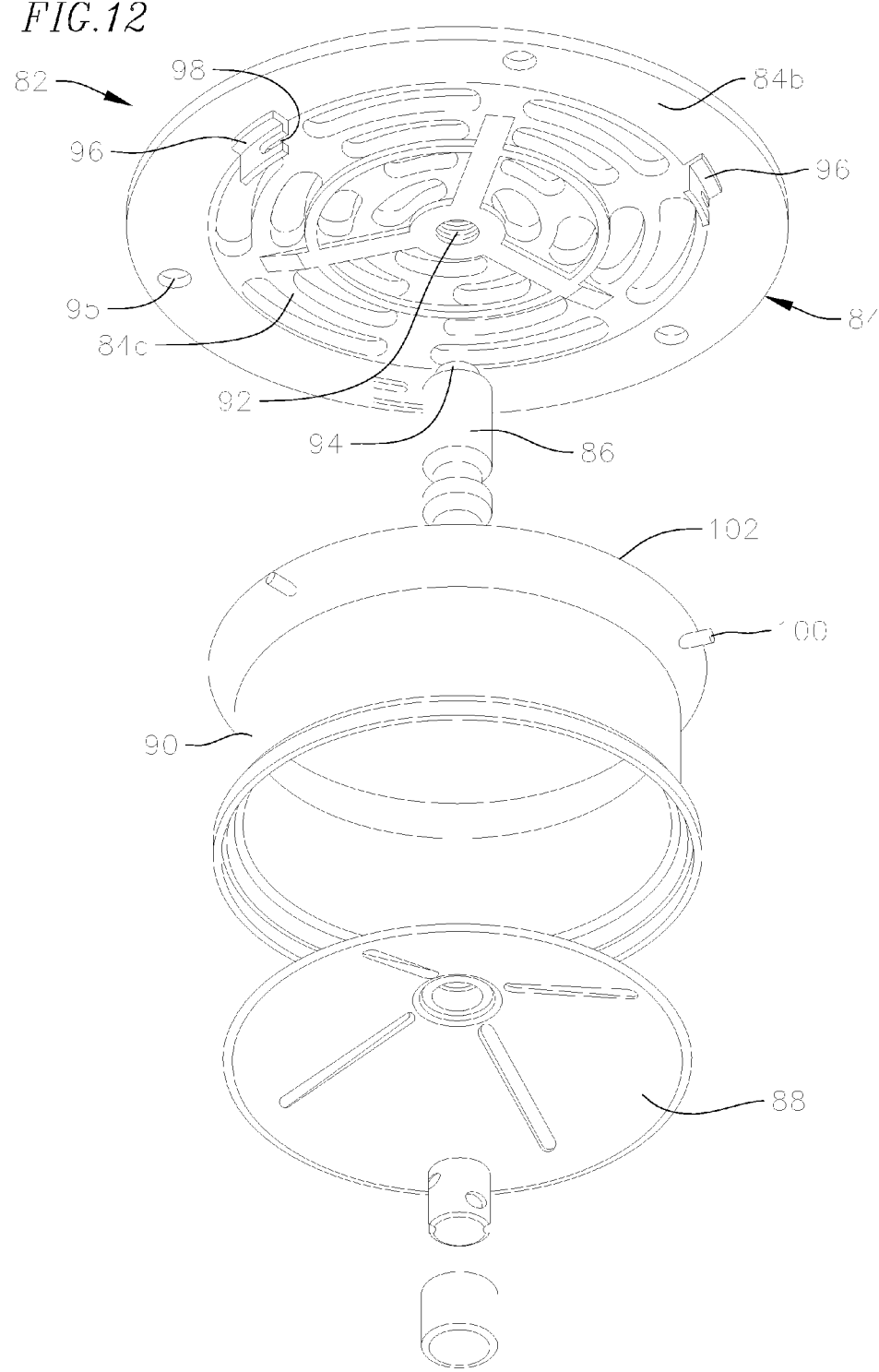

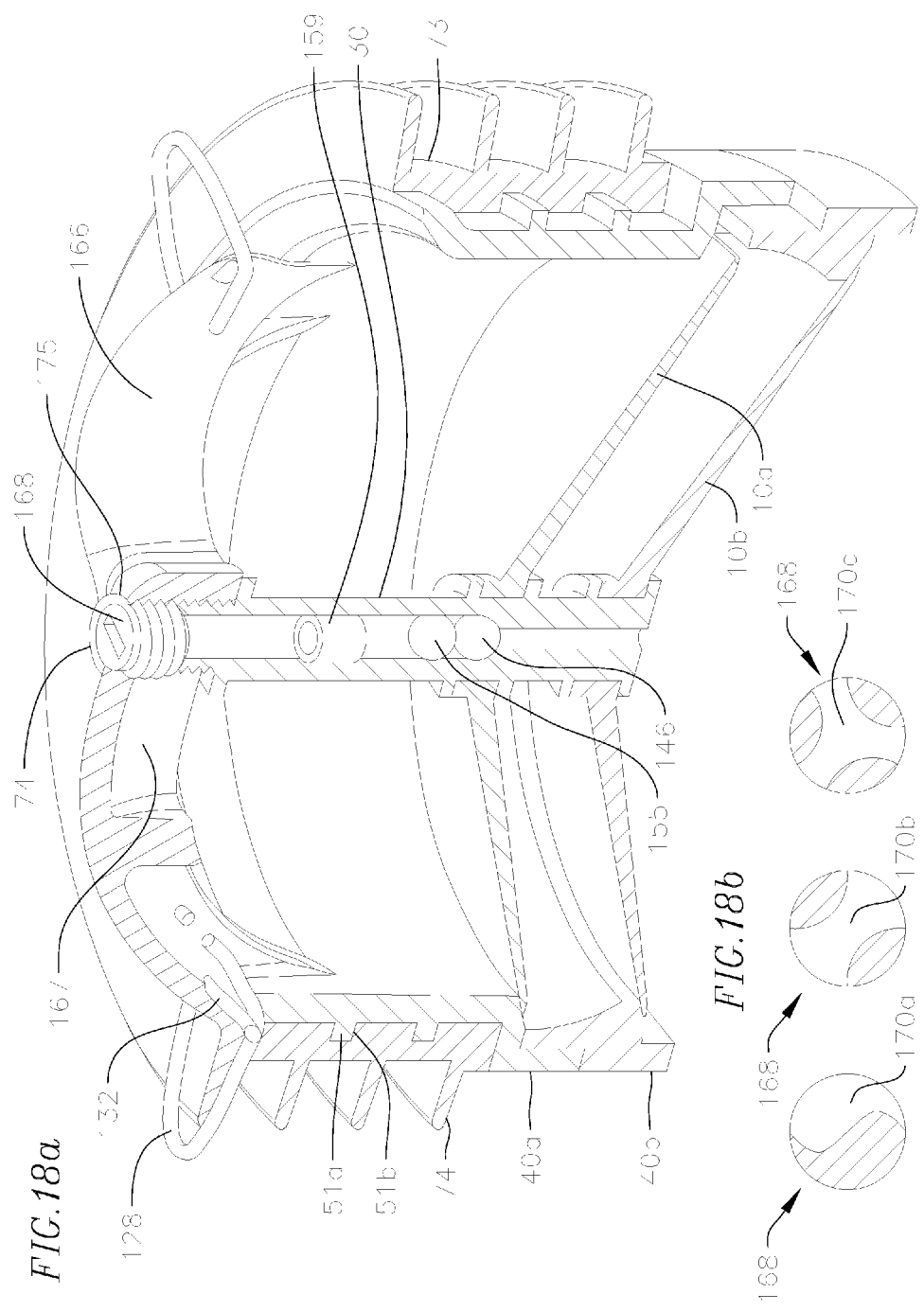

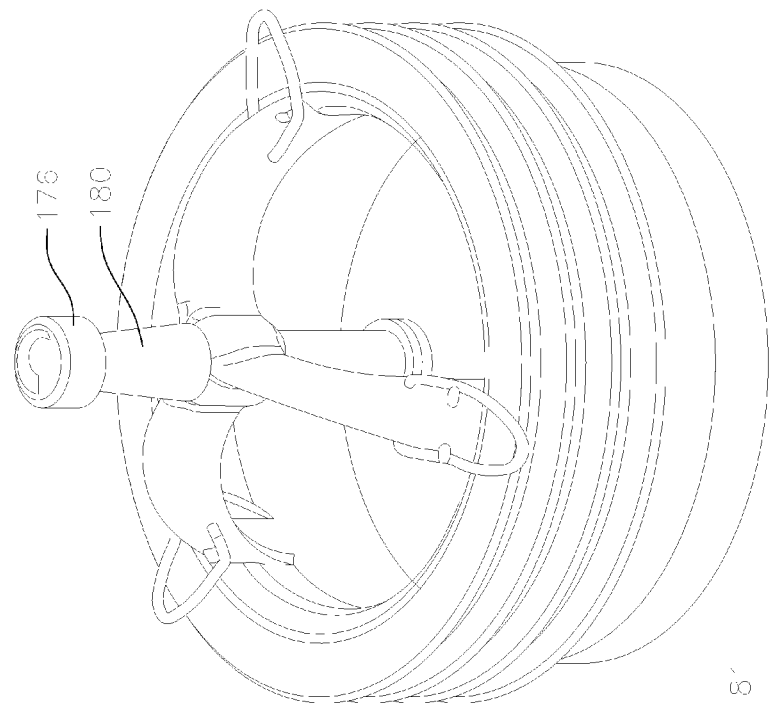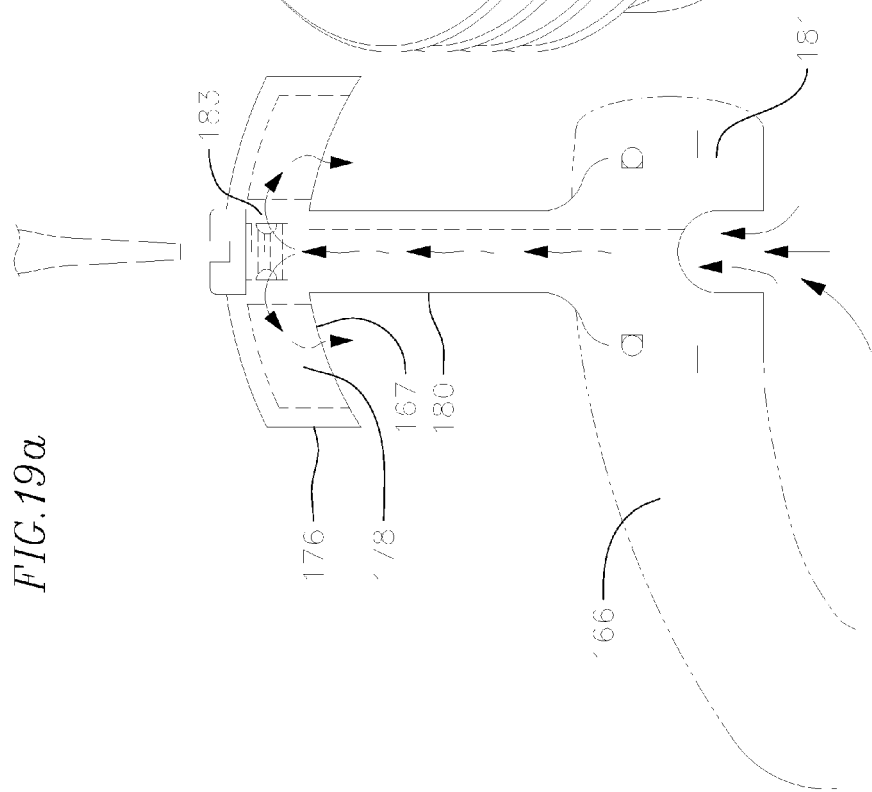

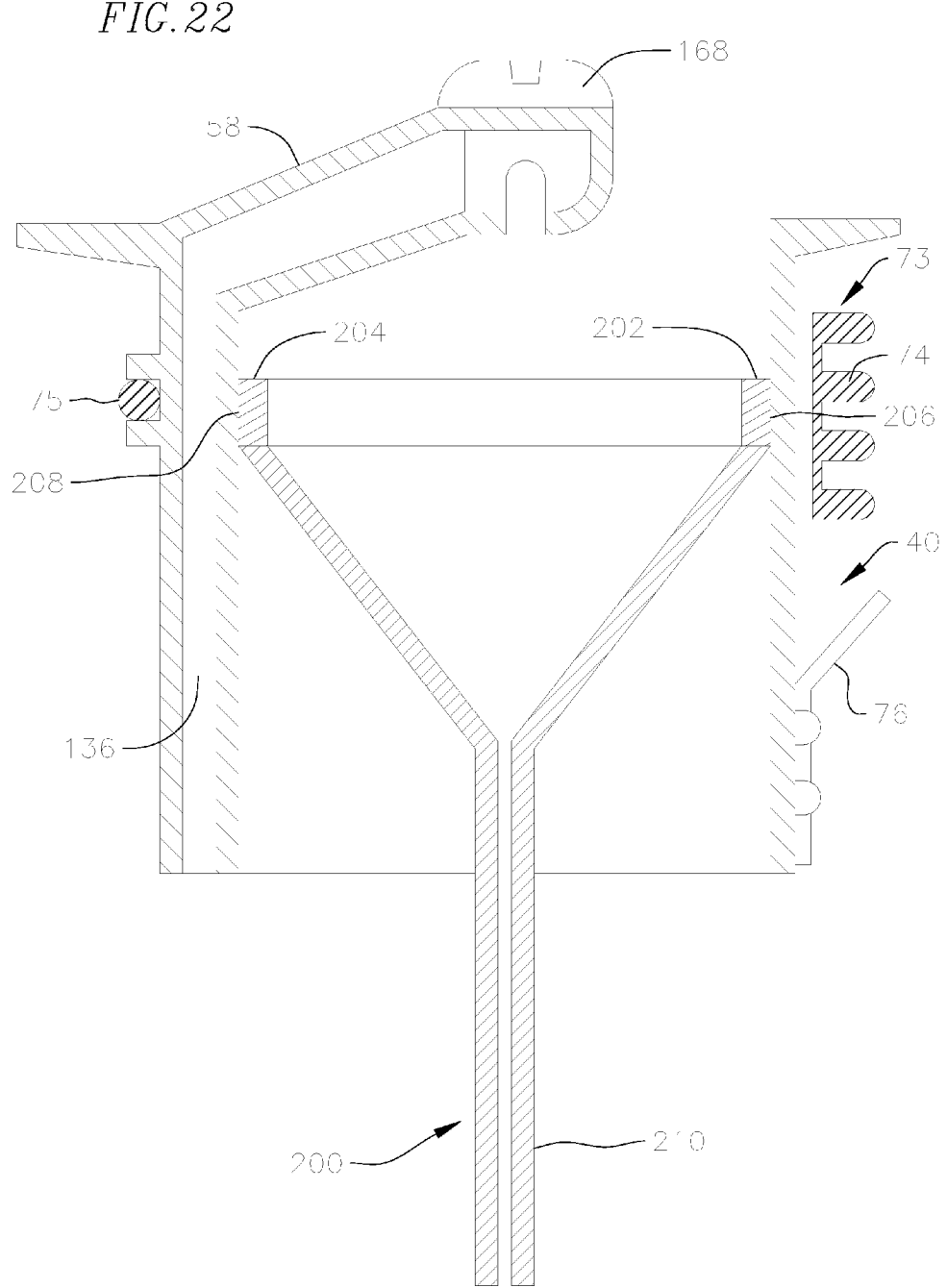

GRAVITY DRAIN VALVE

CROSS-REFERENCE TO RELATED APPLICATION(S)

This application is based upon and claims priority on U.S. Provisional Application Ser. No. 61/995,846, filed on Apr. 22, 2014 and titled "FLOOR DRAIN VALVE AND WATER FLUSH URINALS GRAVITY VALVE WITH AUTOMATIC VENTING SYSTEM," the contents of which are fully incorporated herein by reference.

BACKGROUND OF THE INVENTION

This disclosure concerns drain valves in which fluid can flow down a drain under the action of gravity. More particularly, this disclosure concerns drain valves for location in a liquid outflow from a urinal, sink, floor drain or the like. Open gravity drains allow escape of odorous gas or vapor into the surrounding air. Furthermore, they can expose individuals to airborne contaminants or, in the case of back-flow, water-borne contaminants, thereby increasing the risk of infection and potential disease transmission. It is a known fact that urine is highly corrosive and if not flushed periodically with water, it can corrode drain pipes.

In a conventional open drain, without a trap such as a urinal or floor/ground drain, it is customary to flush the drain with water and/or a cleaning solution regularly in order to prevent the above problems. However, this consumes significant volumes of liquid, which represents an inefficient and wasteful use of available water resources.

In the event that an open drain is flushed or washed less regularly, the drain can become unsanitary and the odor emanating from the drain can attract unwanted insects and vermin to its vicinity. More recent trends towards chemical or 'dry' cleaning mean that the drain is more susceptible to debris retention and clogging. In the event that a drain trap is used, clogging is particularly problematic and can quickly block the drain.

In order to help maintain the sanitary nature of a drain and prevent escaping odor, there have been proposed a number of devices for insertion into the drain opening within the prior art. Certain examples propose the use of chemical holder within the urinal and open drain. However, such examples are typically bulky, such that they are not well suited to a retro-fit of existing drains, as well as being expensive to manufacture. The use of chemicals means that the device requires frequent replacement, such that the ongoing cost to an end user is significant. Also, the chemical is a known pollutant and so the disposal of the chemical within such devices represents a major and costly undertaking at the water reclamation center.

Other examples of prior art devices comprise simpler valves, which are intended to remain closed when at rest, so as to prevent escape of gas from within the drain, but which open to allow liquid flow down the drain.

Other types of valve members that may be used including sheath valves or a hinged, flapper valve. Duckbill valves may offer a further alternative in this context. However, the available static flow area of those valves and the weight of liquid required to actuate the valve member into its open condition cause potential problems. For example, a volume liquid may be retained above the valve member for extended periods of time, which can in itself be odorous or otherwise unsanitary. In some instances solids like cigarettes butts, tooth picks, mop strings and sand can catch on the hinge member causing the valve to stay in the open position for long period of time.

Furthermore, the maximum flow rate permitted through the above examples of prior art valves is limited by the valve design and construction and may be insufficient to accommodate rapid flushing do to its narrow valve inside opening or, particularly in the case of ground drains, flooding.

The inventor has also found that the provision of a mechanical valve at a drain opening can cause further problems. More specifically, the movement of fluid within a drain system can cause pneumatic pressure within the drain and, in the case of drain backflow, hydraulic pressure at the drain opening. For an open drain, this pressure would naturally be relieved. However, where a liquid drain trap is used, the pressure acts on the underside the drain valve. This can lead to the build-up of excessive pressure within the drain, which may in itself be problematic for correct drain function, and which can in turn cause the drain valve to deform and/or become unseated, thereby preventing correct operation once the back-pressure is relieved.

BRIEF SUMMARY OF THE INVENTION

According to an example embodiment, there is provided a drain valve device comprising a drain valve housing arranged to be located within a drain opening. The housing has a wall structure surrounding an axis so as to define an internal flow passage through the housing and a raised strut depending radially inwardly from the wall structure. The device has one or more valve membrane-type members referred to herein as "membranes" or "membrane valves". The post mount is held within the flow passage on the raised strut such that the one or more valve member contacts a valve seat on the housing wall structure. The raised strut is angled relative to the axis such that the strut protrudes clear beyond the internal flow passage.

According to another example embodiment, there is provided a drain valve device for location within a drain opening. The device has a drain valve housing having a wall structure defining an internal flow passage through the housing. The device has a post support for one or more valve membranes, the support being held within the flow passage such that the one or more valve membranes contacts a valve seat on the housing wall structure. The post mount and/or support are selectively configurable to accommodate one or a plurality of valve membranes within the housing. The valve membranes may be in the form of skirts forming "skirt valves".

According to yet another example embodiment there is provided a drain valve support comprising a rigid post member having an engagement formation for attachment to a drain valve support structure. The post member has one or more membranes in the form of a skirt molded thereon such that the skirt valve is fused or otherwise integrally formed onto post member, the skirt valve being of a softer material than the post and a major cost savings in manufacturing and assembly.

According to a further example embodiment, there is provided a drain valve assembly comprising a drain cover having a plurality of flow openings therein and a valve support member mounted to the drain cover, the valve support member comprising one or more flexible valve member depending therefrom, the assembly further comprising a valve member housing mounted relative to the drain cover so as to define a flow passage from the flow openings through the housing into the drain in use, the valve support member protruding into the housing such that the one or more valve member is located in the flow passage and contacts an internal surface of the housing.

According to yet a further example embodiment, there is provided a valve member for a drain valve, the valve member comprising a resilient elastomeric material and being shaped so as to provide a central shoulder collar portion for mounting the valve member in use and a peripheral skirt depending radially outwardly from the shoulder collar portion, the skirt portion being arranged to yield in response to the presence of liquid thereon in use, wherein the skirt comprises one or more region of weakness to promote a folding action of the skirt upon yielding.

According to yet another example embodiment, a drain valve is provided including a venting feature for venting at a location above an upper rim of the valve housing. The venting feature may include a snorkel type of venting system that shuts the venting system down when the liquid level in the drain exceeds above a predetermined level. This type of valve may include any different type of valve members to allow flow toward the drain direction but and to prevent flow or gas flow in an opposite direction. Such valve members for example include skirt valves or duckbill valves. A device may be provided to selectively shut off the venting feature.

In one example embodiment, a drain valve is provided including a housing having a wall surrounding an axis so as to define an internal flow passage through the housing, a post within the housing, a raised strut member depending radially inwardly from the wall toward the post, one or more valve members coupled to the post, each valve member contacting a corresponding valve seat on the housing wall, wherein the raised strut is angled relative to the axis such that at least a portion of the raised strut extends above the housing wall. In another example embodiment, the wall comprises a peripheral rim and the raised strut protrudes beyond the peripheral rim in the direction of the axis. In yet another example embodiment, the peripheral rim defines an end of the housing and the internal flow passage. In a further example embodiment, a majority of the raised strut is outside of the internal flow passage. In yet a further example embodiment, the raised strut is obliquely angled relative to the axis. In one example embodiment, the raised strut is curved along its longitudinal axis. In another example embodiment, the raised strut terminates at a free end at or adjacent the axis. In yet another example embodiment, the raised strut includes an engagement formation for engagement with the post. In a further example embodiment, the engagement formation includes a releasable engagement formation arranged to cooperate with a corresponding formation on the post. In yet a further example embodiment, the post is suspended from the raised strut. In one example embodiment, the drain valve also includes a perforated cover member having a plurality of perforations, the cover member arranged to cover an end of the internal flow passage. In another example embodiment, the cover member includes a cut-out to accommodate the raised strut therein. In yet another example embodiment, the cover member protrudes beyond a peripheral rim of the wall structure. In a further example embodiment, the cover member is domed shaped. In yet a further example embodiment, the wall includes first and second coaxial sections connected together, wherein the first section includes a first valve seat and the second section includes a second valve seat.

In another example embodiment, a drain valve is provided including a drain housing having a wall defining an internal flow passage through the housing, and a post supporting a plurality of valve members, the post being held within the flow passage such that the one or more valve member contacts a valve seat on the housing wall, wherein the post is selectively configurable to accommodate the plurality of valve members within the housing. In yet another example embodiment, the post includes a first engagement formation at one end thereof for mounting the post in the flow passage and a further engagement formation at an opposing end thereof for attachment to a further post. In a further example embodiment, the at least one of the plurality of valve members is mounted to the post in between the first and second engagement formations. In yet a further example embodiment, a further post is attached to the further engagement formation, the further post having another valve member of the plurality of valve members mounted thereon. In one example embodiment, the post and further post are coaxially connected together such at least one valve member and the another valve member are spaced along a common axis. In another example embodiment, each of the plurality of valve members includes a flexible material surrounding at least one of the post and further post. In yet another example embodiment, at least one of the plurality of valve members is fused to one of the post and further post. In a further example embodiment, at least one of the plurality of valve members is integrally formed with one of the post and further post. In yet a further example embodiment, the housing wall includes a first portion having one or more engagement formations at a peripheral end thereof for selective attachment of a second housing wall portion thereto. In one example embodiment, the first housing wall portion includes a first valve seat formation and the second housing wall portion includes a second valve seat formation. In another example embodiment, each of the first and second housing wall portions include an internal annular surface, the internal annular surfaces being substantially radially aligned when the housing portions are connected, wherein the first and second valve seat formations each depend radially inwardly from the surfaces. In yet another example embodiment, the first and second housing wall structure are connectable in an end to end arrangement about a common axis. In a further example embodiment, the first and second housing wall portions each include a complete annulus and wherein a peripheral rim of the first housing wall portion is connectable to an opposing peripheral rim of the second housing wall portion. In yet a further example embodiment, the first and second housing wall portions are connectable at an interface and a seal gasket is attachable to an outside wall of either or both of the first and second portions for sealing the valve against a drain wall in use. In one example embodiment, the seal gasket includes a plurality of longitudinally spaced apart sealing flanges extending radially therefrom for sealing the valve against the drain. In another example embodiment, the post is removably attachable to the housing.

In yet another example embodiment, a drain valve assembly is provided including a drain cover having a plurality of flow openings therein and a valve support member mounted to the drain cover, the valve support member including one or more flexible valve members depending therefrom, the assembly further including a valve member housing located adjacent the drain cover so as to define a flow passage from the flow openings through the housing, the valve support member protruding into the housing such that the one or more flexible valve members are located in the flow passage and contact an internal surface of the housing. In a further example embodiment, the valve support member is mounted directly to the drain cover. In yet a further example embodiment, the housing is mounted to the drain cover. In yet a further example embodiment, the drain cover includes a plurality of recesses arranged to receive a corresponding plurality of projections on the housing so as to releasably affix the housing to the cover.

In one example embodiment, a drain valve housing for an open drain is provided including a housing wall having one or more valve seats therein for contact with a valve member supported within the valve housing in use, the housing including a peripheral wall and a sealing gasket located about the peripheral wall for contact with the interior of a drain opening, wherein the valve housing includes one or more retaining members arranged to depend radially outwardly of the housing so as to retain the housing within the drain opening. In another example embodiment, the one or more retaining members are biased outwardly of the valve housing. In yet another example embodiment, the one or more retaining members are actuable between a deployed condition in which the one more retaining members depend radially outwardly of the housing perimeter and a retracted condition in which the one or more retaining members are within the housing perimeter. In a further example embodiment, the one or more retaining members are hingedly mounted to the housing. In a further example embodiment, the one or more retaining members include an arm. In yet a further example embodiment, the one or more retaining members include an elbow formation part way along its length. In one example embodiment, the one or more retaining members include a resilient barb formation.

In one example embodiment, a valve member for a drain valve is provided. The valve member including a resilient elastomeric material and having a central shoulder collar portion for mounting the valve member in use and a peripheral skirt portion depending radially outwardly from the shoulder collar portion, the skirt portion being arranged to yield in response to the presence of a liquid thereon in use, wherein the skirt includes one or more regions of weakness to promote a folding action of the skirt upon yielding. In another example embodiment, wherein the one or more regions of weakness include one or more elongate grooves. In yet another example embodiment, the one or more regions of weakness include an annular groove proximal the shoulder collar portion. In a further example embodiment, wherein the one or more regions of weakness include one or more radial grooves. In yet a further example embodiment, the one or more regions of weakness include a plurality of areas of weakness depending outwardly from the shoulder collar portion, the areas being substantially equally angularly spaced about the shoulder collar portion. In one example embodiment, the skirt portion tapers from a thicker region towards the shoulder collar portion towards a thinner region towards a peripheral edge of the skirt opposite the shoulder collar. In another example embodiment, the valve member includes one or more portions, the one or more portions being arranged to change color over a period of valve use.

In yet a further example embodiment, a drain valve system is provided including a housing arranged to be located in a drain opening and one or more non-return valves supported within the housing, wherein each of the one or more non-return valves includes a first side facing away from the drain and a second side facing toward the drain, wherein the system further includes a bypass flow passage arranged to provide a flow that bypasses the one or more non-return valves while the one or more non-return valves are in a closed condition, the bypass flow path allowing venting of gas from within the drain interior to a location exterior of the drain. In one example embodiment, the bypass flow passage is formed within the housing. In another example embodiment, the bypass flow passage is provided within a post from which the one or more non-return valves extend. In yet another example embodiment, the post is aligned with a central axis of the housing. In a further example embodiment, the drain valve system further includes a raised strut, wherein the bypass flow passage extends to the raised strut, wherein a flow through the bypass flow passage will flow through the raised strut. In yet a further example embodiment, at least a portion of the raised strut extends above an upper end of the housing. In one example embodiment, the raised strut has a hollow interior for receiving the flow through the bypass flow passage and an outlet for the venting of the flow to the atmosphere. In another example embodiment, the post is mounted to a drain cover member having a plurality of flow openings therein. In yet another example embodiment, the bypass flow passage has an outlet to atmosphere that is located above the housing. In a further example embodiment, the bypass flow passage includes a valve seat therein. In yet a further example embodiment, the bypass flow passage includes a bypass valve member therein. In one example embodiment, the bypass valve member is seated on the valve seat in normal use and is arranged to selectively permit flow through the bypass passage when a pressure of a flow is sufficient to lift the bypass valve member from the post valve seat. In another example embodiment, the bypass valve member is spaced from the valve seat in normal use and is arranged to be lifted into contact with the valve seat when a liquid rises within the bypass flow passage. In yet another example embodiment, the bypass flow passage includes a plurality of valve seats therein and one or more bypass valve member arranged to selectively cooperate with the valve seats. In an further example embodiment, the bypass flow passage includes an outlet opening that is elevated above a liquid flow inlet opening into the drain valve housing. In yet a further example embodiment, the bypass flow passage includes snorkel construction. In one example embodiment, the system includes an actuable vent control member for selectively permitting or inhibiting flow through the bypass flow passage. In another example embodiment, the vent control member includes a body with an internal channel arranged to allow flow there-through when in a first orientation and to prevent flow there-through when in a second orientation.

In yet another example embodiment, a drain valve is provided including a housing defining a drain conduit for the passage of fluids to be drained, the drain conduit having a first rim defining an inlet opposite a second rim defining an outlet, a raised strut extending from the housing, wherein at least a portion of the raised strut extends above the first rim, a post coupled to the raised strut, a first skirt valve extending radially outwardly from the post and toward the second rim, and a first valve seat extending from an inner surface of the housing wherein a radially distal portion of the first skirt valve sits against the first valve seat. In a further example embodiment, the drain valve further includes a sealing annular sleeve including a plurality of longitudinally spaced apart projections extending radially inward and a plurality of longitudinally spaced apart sealing flanges extending radially outward, wherein the projections are received in corresponding depressions formed on an outer surface of the housing. In yet a further example embodiment, the drain valve further includes at least one clip moveable from a first position to a second position, wherein when in the first position the entirety of the clip does not extend radially outward beyond the first perimeter and wherein when in the second position at least a portion of the clip extends radially outward beyond the first rim. In one example embodiment, the drain valve further includes a preventer for resisting movement of the clip from the second position to the first position. In another example embodiment, the post is hollow defining a first conduit, wherein at least a portion of the raised strut is hollow defining a second conduit, wherein a strut outlet is formed on the strut, wherein the first conduit is in communication with the second conduit, wherein a flow path is defined along the first conduit and the second conduit extending to the raised strut outlet, such that a flow through the first conduit flows through the second conduit and exits the raised strut through the strut outlet. In yet another example embodiment, the drain valve further includes a vent control member along the flow path upstream of the outlet for selectively blocking flow to the raised strut outlet. In a further example embodiment, the post extends along a longitudinal axis of the housing, wherein the post engages the raised strut along the axis, and wherein the vent control member is located along the longitudinal axis. In yet a further example embodiment, the drain valve further includes a drain cover over housing and the post. In one example embodiment, the drain valve further includes a further hollow post defining a third conduit in communication with the first and second conduits, the further post including an outlet extending above the post and raised strut. In another example embodiment, the further post extends coaxially above the post. In yet another example embodiment, the drain valve further includes a first float valve member in the first conduit, wherein a first float valve seat is defined in the first conduit, and wherein when the first float valve member sits on the first float valve seat it blocks flow through the first conduit. In a further example embodiment, the drain valve further includes a second float valve member in the first conduit, wherein a second float valve seat is defined in the first conduit, and wherein when the second float valve member sits on the second float valve seat it blocks flow through the first conduit. In yet a further example embodiment, the drain valve also includes a second skirt valve extending radially outwardly from the post and toward the second rim, the second skirt valve being longitudinally spaced apart from the first skirt valve, and a second valve seat extending from an inner surface of the housing wherein a radially distal portion of the second skirt valve sits against the second valve seat. In one example embodiment, the second skirt valve has the same diameter and the same geometry and the first skirt valve. In yet another example embodiment, the drain valve further includes at least one barb extending outward from the housing. In a further example embodiment, the at least one barb includes a first portion extending outward of the housing from the second rim in a direction toward the first rim and a second portion extending from the first portion and in a direction radially outward and toward the first rim. In yet a further example embodiment, the post includes a first portion and a second portion separate from the first portion and coupled to the first portion and wherein the housing includes a first portion and a second portion separate from the housing first portion coupled to the housing first portion, wherein the first skirt valve extends from the first post portion and wherein the first valve seat is formed on an inner surface of the first housing portion, and wherein the valve includes a second skirt valve extending from the post second portion and a second valve seat formed on an inner surface of the housing second portion, wherein a distal portion of the second skirt valve sits on the second valve seat. In one example embodiment, the second skirt valve has the same diameter and the same geometry and the first skirt valve. In another example embodiment, at least one of the skirt valve, the post, or the housing includes a material that glows in the dark. In yet another example embodiment, at least a portion of the skirt valve changes color to a color indicating that the valve has to be serviced or replaced. In a further example embodiment, the drain valve further includes a chip mounted on the drain valve for providing information about the valve when interrogated. In yet a further example embodiment, at least a portion of the first skirt valve is coated with a hydrophobic coating. In another example embodiment, wherein the post is threaded into the strut.

In one example embodiment, a drain valve is provided including a housing defining a drain conduit for the passage of fluids to be drained, the drain conduit having a first rim defining an inlet opposite a second rim defining an outlet, and a vent conduit extending within the drain conduit and to a location external of the housing in a direction opposite of the second rim, wherein a vent conduit outlet is defined in a location external of the housing. In another example embodiment, the drain valve further includes a sealing annular sleeve including a plurality of longitudinally spaced apart projections extending radially inward and a plurality of longitudinally spaced apart sealing flanges extending radially outward, wherein the projections are received in corresponding depressions formed on an outer surface of the housing. In yet another example embodiment, the drain valve also includes at least one clip moveable from a first position to a second position, wherein when in the first position the entirety of the clip does not extend radially outward beyond the first perimeter and wherein when in the second position at least a portion of the clip extends radially outward beyond the first rim. In a further example embodiment, the drain valve further includes a preventer for resisting movement of the clip from the second position to the first position. In yet a further example embodiment, the drain valve also includes a vent control member along the vent conduit for selectively blocking flow to the outlet of the vent conduit outlet. In yet a further example embodiment, the drain conduit includes a first longitudinal portion and a second portion extending transversely over the first longitudinal portion and over the first rim, wherein the vent conduit outlet is formed on the second portion. In one example embodiment, the drain valve further includes a drain cover over housing and the vent conduit. In another example embodiment, the drain valve also includes a duckbill valve within the housing. In yet another example embodiment, the drain valve further includes a hollow post defining a another vent conduit, the hollow post being mounted onto and above the vent conduit. In a further example embodiment, the drain valve also includes a first float valve member is the vent conduit, wherein a first float valve seat is defined in the vent conduit, and wherein when the first float valve member sits on the first float valve seat it blocks flow through the vent conduit. In yet a further example embodiment, the drain valve further includes a second float valve member is the vent conduit, wherein a second float valve seat is defined in the vent conduit, and wherein when the second float valve member sits on the vent float valve seat it blocks flow through the vent conduit. In one example embodiment, the drain valve also includes at least one barb extending outward from the housing. In another example embodiment, the at least one barb includes a first portion extending outward of the housing from the second rim in a direction toward the first rim and a second portion extending from the first portion and in a direction radially outward and toward the first rim. In yet another example embodiment, wherein the housing includes a material that glows in the dark. In a further example embodiment, the drain valve further includes a chip mounted on the drain valve for providing information about the valve when interrogated. In yet a further example embodiment, at least a portion of the first skirt valve is coated with a hydrophobic coating. In another example embodiment, the post is threaded into the raised strut.

Wherever practicable, any of the features defined in relation to any one example embodiment may be applied to other example embodiments. Accordingly embodiments may include various alternative configurations of the features defined above.

BRIEF DESCRIPTION OF THE DRAWINGS

These and other features and advantages of embodiments of the present disclosure will become more apparent by reference to the following detailed description when considered in conjunction with the following drawings. In the drawings, like reference numerals are used throughout the figures to reference like features and components. The figures are not necessarily drawn to scale.

FIGS. 4 and 5 show respective plan and section views of a further example of a valve member for use in a drain valve according to the invention;

FIGS. 6 and 7 show respective section and plan views of another example of a valve member for use in a drain valve according to the invention;

FIGS. 11a-11d show respective exploded, section, side and plan views of drain valve assemblies according to examples of the invention;

FIG. 12 shows an exploded three-dimensional view of a further example of a drain valve assembly according to the present invention;

FIG. 18a shows a cross section perspective view of an example embodiment drain valve;

FIG. 18b shows top cross-sectional views of example embodiment vent control members showing various channels;

FIG. 18c is a perspective view of the example embodiment drain valve shown in FIG. 18a;

FIG. 19a is a partial cross-sectional view of a vent post according to an example embodiment of the present invention;

FIG. 19b is a perspective view of an example embodiment drain valve incorporating the example embodiment venting post shown in FIG. 19a;

FIG. 22 is a schematic cross-sectional view of another example embodiment valve including a duckbill.

DETAILED DESCRIPTION OF THE INVENTION

The following description sets out in different sections the different structural components and functions for a number of high flow and/or pressure venting gravity drain valve arrangements. Since the present disclosure comprises numerous developments over existing drain valves, it will be understood that different combinations of structural components and features from the different sections of this disclosure may be combined in ways other than those shown explicitly in the accompanying figures. Accordingly, the scope of the invention is to be defined by the accompanying claims and may accommodate any such combinations of features wherever practicable, whether or not a particular combination is explicitly disclosed herein. It is to be understood by the reader that features of smaller diameter drain valves, such as for urinals, sinks, baths and the like may be applied to larger drain valves, such as floor/ground drain valves, and vice-versa, wherever beneficial.

Valve Member

The drain valves to be described herein may comprise a single valve member or a plurality of valve members depending on the specific requirements of the drain to be accommodated. In some, but not all aspects of the invention, the, or each, valve member comprises a resiliently deformable material, which is actuable under application of a volume of liquid thereto, and which returns to its at-rest or undeformed condition upon removal/run-off of the liquid therefrom. A deformable portion of the valve member, or the valve member as a whole, may be formed of a suitably compliant material, such as an elastomer or other suitably inert elastomeric polymer. The specific examples described herein comprise a silicone rubber valve member.

Figure 1:
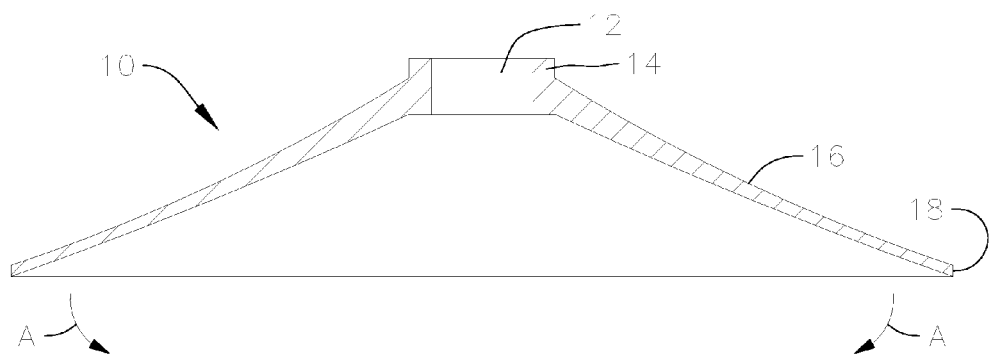
FIG. 1 shows a section view through a valve member which may be used in drain valves according to the invention.
Figure 2:
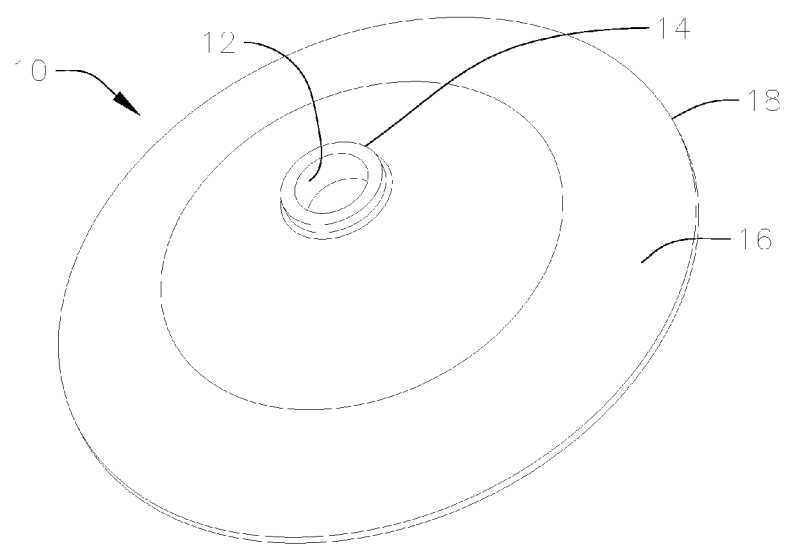
FIG. 2 shows a three-dimensional view of the valve member of FIG. 1.

FIGS. 1 and 2 show the basic structure of an example embodiment valve member 10 that is generally of the form of a skirt valve or umbrella valve. The valve member 10 is a membrane valve that is circular in plan and has a central opening 12 arranged to receive a mounting post in use. The material of the valve member 10 is thickened in a shoulder region of the opening 12 so as to define a supportive central mounting section 14, e.g. a shoulder collar formation. A skirt portion or skirt 16 depends radially outwardly from the central section 14 towards the outer peripheral edge 18. The skirt is a membrane that surrounds the central section 14 such that the peripheral edge is concentric with the central opening. Thus, this valve is also referred to herein for illustrative purposes as a "skirt valve".

The skirt 16 is obliquely angled so as to define a frusto-conical valve member profile. The angle of the skirt away from a flat form is preferably in the region of 20° to 50° and more preferably in the region 25° to 33° or 40°. In this particular example the angle is approximately 30°, although it will be appreciated by the skilled person that in different examples, the valve member will be sized and shaped to fit the required dimensions of a particular drain opening or associated valve housing.

The wall thickness of the skirt generally tapers from its thickest, close to the central section 14, towards the outer edge 18. The wall thickness may be a minimum at or adjacent the outer edge 18, or else in one of the 'reduced-thickness' regions to be described below.

Figure 3:
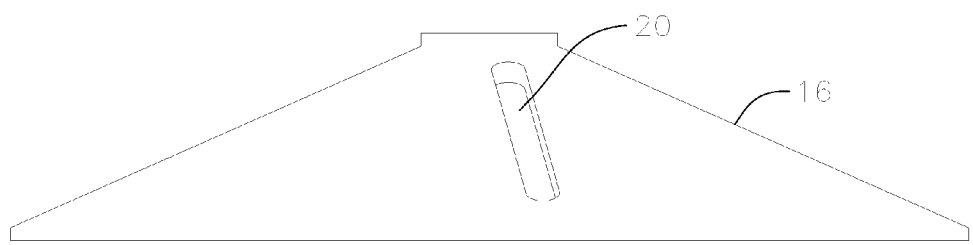
FIG. 3 shows a three-dimensional view of an alternative valve member for use in a drain valve according to the invention.

In FIG. 3 the valve member 10 may in other example embodiments additionally comprise one or more portions 20 that are of a different color to the remainder of the skirt 16. The portion 20 provides a usage/life indicator for the valve member 10. In this example, the indicator portion 20 is comprises a radial strip, a plurality of which may be provided at angled spacing about the skirt 16. In other examples, the indicator portion may cover substantially the entirety of the skirt 16 or another region to that shown in FIG. 3.

The indicator portion 20 is configured to degrade or react in use so as to cause a noticeable color change. Various options for such an indicator portion are available, including an erodible/dissolvable coating which disappears over time or a coating material which erodes to reveal a different color material beneath. Alternatively, the indicator portion may react with a relevant liquid, such as urine, or else over time so as to cause an irreversible color change.

In another example, whether or not the indicator portion 20 is degradable, the indicator portion 20 could comprise a light-emitting, e.g. luminescent, material. The light-emitting material may absorb light energy when irradiated/illuminated such that it can be seen to glow by an observer when the ambient light level is lower. The material could be a polymer having one or more active, light-emitting ingredient. A chemically/biologically inert material may be used, such as, for example Strontium Aluminate. The indicator portion 20 may be a different color from the remainder of the valve such that it is clearly visible in lit conditions also. In one example, the indicator portion 20 is degradable as an indicator of the functional life of the valve. The luminescence of the indicator portion 20 may degrade over time or use.

In use, when a small volume of liquid is trapped on the upper surface of the valve member 10, the skirt will flex away from the shape shown in FIGS. 1-3 in the direction of arrows as shown in FIG. 1. The shape of the skirt allows liquid to run over the peripheral edge 18. The shape/taper of the valve skirt is important in ensuring the skirt returns to its at-rest condition when not acted upon by external forces. However this also typically causes greatest flexing of the skirt towards its peripheral edge 18, thereby causing a flow obstruction towards the central section 14, where the skirt is less readily deformed.

FIGS. 4-7 show further developments of the valve member 10 to encourage flexing of the skirt in a manner that is beneficial to operation of the valve member in use. With reference to FIGS. 4 and 5, one or more region of reduced wall thickness is provided to encourage flexing of the skirt 16 in a desired manner when liquid is applied thereto. A plurality of annular indentations/grooves 22 are provided in the skirt portion 16, typically on its underside. The annular grooves 22 are concentric with the central opening 12 and located relatively close to, or adjacent the central section 14 (i.e. at least radially closer to the central opening 12 than the peripheral edge 18).

The use of one or more annular grooves 22 of the kind shown in FIGS. 4 and 5 encourages flexing of the skirt closer to the central section 14, thereby potentially reducing the magnitude of the force required to deform the valve member and thereby open the valve to increase flow. The reduced resistance to flexing near to the central section may also allow increased flexing of the valve for an applied force, thereby increasing the available flow area for liquid passing through the valve.

While three annular grooves 22 are shown, it is envisaged that a single groove may be provided in alternative examples or else two or more grooves, depending on valve size and the required deformation behavior of the valve member. The, or each, groove 22 may define a complete or partial annulus about the central opening as necessary.

Also shown in FIG. 4 are further regions of weakness 24. These regions 24 extend in a generally radial direction from a location proximal the central section 12. The regions of weakness are formed as regions of reduced wall thickness in the skirt 16, typically on its underside. In this example the regions of weakness 24 are generally wedge shaped or triangular in plan view. Two regions 24 are provided on either side of the central opening 12, although three or four or more regions could be provided in other examples.

The radial regions of weakness 24 encourage a predetermined folding action of the valve member 10 upon flexing. Such a folding action may beneficially reduce the force required to open the valve and/or increase the maximum available flow area in the valve when open.

In FIGS. 6 and 7 an alternative arrangement of regions of weakness in the skirt 16 are shown. In this example four or more radially extending regions of weakness 26 are provided to encourage multiple folding of the valve member upon application of a head of liquid to the upper surface thereof.

The weakened regions comprise a first set of radial strips 26A equally spaced about the central opening 12. The weakened regions also comprise a second set of radially extending formations 26B located between the strips 26A of the first set. The formations 26B in this example are wider and may be curved in profile than the strips 26A. The formations 26B also coalesce towards the central section 14 so as to form a common weakened portion in the skirt surrounding or adjacent the central section. The folding action caused by the weakened sections of the valve member in this example is therefore akin to an umbrella being closed. That is to say the valve member 10 in this example will generally flex downwardly towards the central section 14, whilst simultaneously folding in opposing directions at each of the adjacent weakened sections 26A and 26B.

It will be appreciated, that whilst it may be advantageous to provide any lines/regions of weakness on the underside of the valve such that those features are not generally fluid washed in use by liquid flowing down the drain, it is additionally or alternatively possible to provide any or any combination of such features on the upper side of the valve member.

Whilst the above examples of skirt valves are provided as being well suited to an arrangement in which the valve member is intended to be mounted on a central post, it will be appreciated that alternative forms of valve member, such as hinged door/flapper valves or duckbill/sheath valves may be substituted for the above described skirt valves in the event that it is intended to use an alternative valve mounting configuration in conjunction with other venting and/or valve housing features disclosed herein. In any examples, the valve features may be formed by the corresponding shape of the mold in an injection, or other, molding tool.

In any examples of the invention, the valve members disclosed herein may act as non-return or one-way valves in use. The valves may allow passage of liquid into the drain but may inhibit or control the flow of gases in a return direction. The valves disclosed herein may act as high flow valves for gravity-fed drain openings.

Valve Member Mounting

Figure 8:
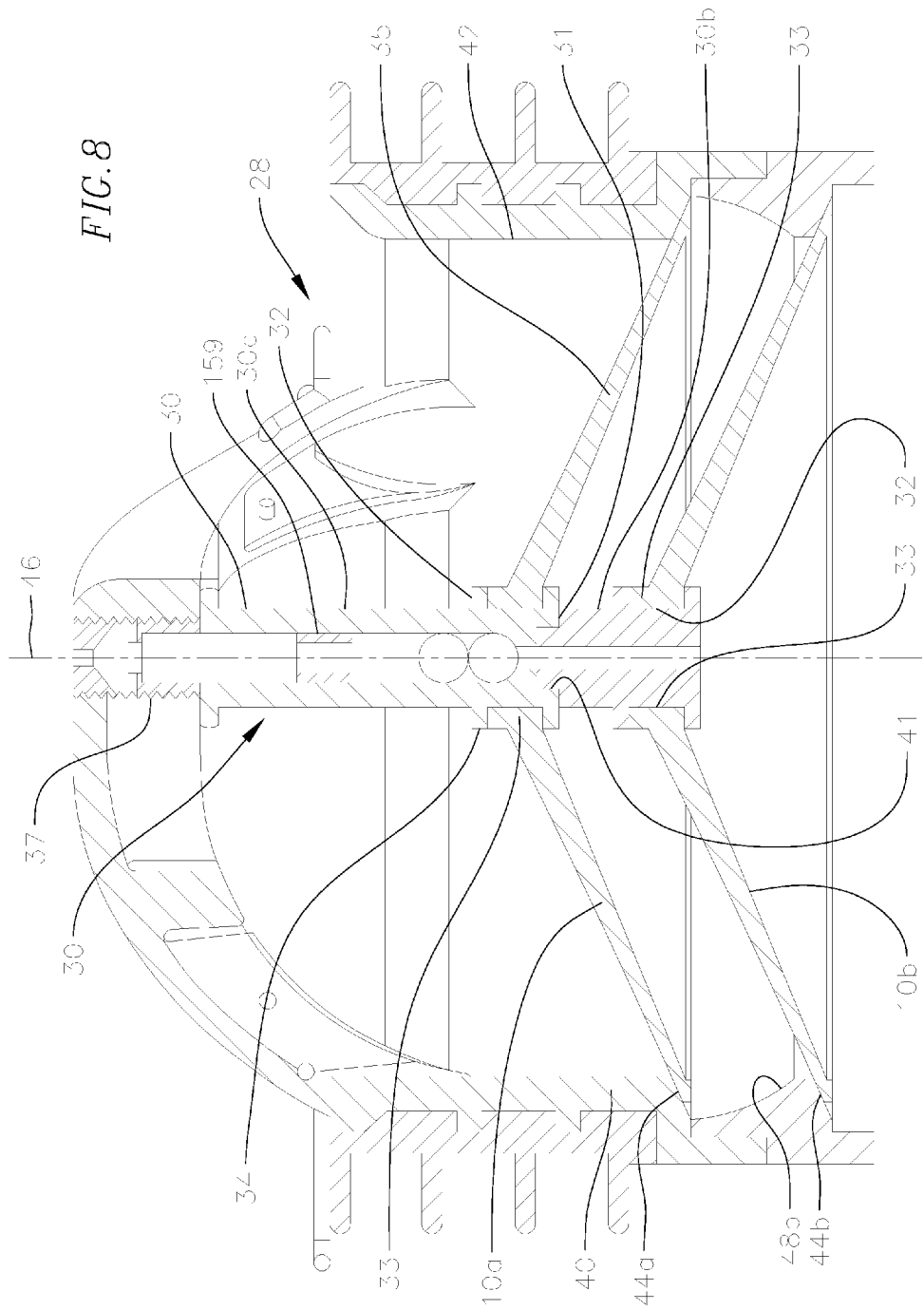
FIG. 8 shows a cross-sectional view of an example embodiment drain valve.

Turning now to FIG. 8, there is shown a section view through a drain valve 28 comprising a valve support in the form of a central post 30. The post 30 is formed of a more rigid polymer material than the valve members 10a and 10b and may comprise a recess 32 arranged to receive the central portion of each valve member at one or more predetermined location along its length. In this example, two recesses 32 are provided at spaced locations along the post so as to allow mounting of the two valve members 10a and 10b at spaced locations along a common axis 46.

The valve members 10a and 10b are generally as described above, save that they each comprise a circumferential recess or groove 22 immediately adjacent the central portion of the valve member to encourage flexing of the valve skirt in use.

Each valve member forms a shoulder collar 33 with skirt 35 surrounding the central post 30 in use. The shoulder collar 33 of each valve member is fitted into a corresponding recess 32 formed on the post. The shoulder collars are annular and elastic such that they can be stretch fitted over the post and recesses and then snap back into the recesses as for example shown in FIG. 8. As can be seen in FIG. 8 each shoulder collar has a cross-sectional shape that is complementary to the cross-sectional shape of its corresponding recess.

While a dual valve arrangement of the type shown in FIG. 8 has been found to be beneficial in a number of applications, particularly where there is higher return gas flow from the drain, the inventor has also realized that a single valve arrangement may be adequate for other applications. Accordingly, the valve mounting of FIG. 8 comprises a modular construction that can be adapted for either single or dual valve member mounting.

In this example, the post 30 comprises two adjacent post portions 30a and 30b that can be attached together as required. Each post portion is shaped to receive at least one valve member 10.

Post portions 30a and 30b comprise opposing engagement formations so as to allow the post portions to be attached together at interface 31, typically in an axial manner, so as to form a single post construction. The engagement formations may comprise, for example, a screw thread, bayonet or twist-lock fitting, a friction fit, or an interference, push-fit or snap-fit connection. Additionally or alternatively an adhesive, such as glue, may be provided at the interface between the two post portions.

The post portions may have a common central internal passage for reasons to be described below, such that their internal passages are aligned upon connection of the post portions together.

The post 30, or upper post portion 30a, comprises an attachment formation 37 for affixing the post to a drain valve support structure or housing as will be described below. In this example, the attachment formation is a screw thread, although in other examples any of the above-mentioned engagement formations could be used. In an example where a plurality of post portions is provided, the engagement formations between adjacent post portions could match the attachment formation for attachment to the valve housing or support structure. Thus a modular post system can be provided in which a common post portion design can be used to construct a post of the length sufficient to accommodate a desired number of valve members 10. In the example embodiment shown in FIG. 8, the attachment formation 37 of portion 30a is a threaded projection or male portion threaded into a threaded recess or female portion 41 of a struct 58. The post portion 30a may also have a threaded recess or female portion 41 at an end opposite the male portion to accept the threaded male portion 37 of the post portion 30b (FIGS. 8 and 11b).

While a single, unitary post construction may be provided in other examples of drain valve, the modular construction described above is advantageous in providing a single design that can accommodate a variety of different applications. This can significantly reduce production costs by requiring a single post portion mold. Also it removes the need to stock multiple different products by retailers/installers for different instances of use. If a greater distance between valve members is preferred, an intermediate post portion could be provided within the final post assembly. Any reference to a 'post' herein-below may comprise a single post portion or a plurality of post portions.

The valve members may be produced separately from the post and may be mounted thereon in order to assemble the mounted valve assembly. However in other examples, one or more valve member 10 may be formed onto, or co-formed with, the post 30, or associated post portion 30a, 30b. A two or more stage molding process may be used to this end. For example a post portion and valve may be formed within a common injection molding cavity, whereby a first polymer material is injected into the mold to form the post, followed by a second, softer material to form the valve member onto the post material. Alternatively a transfer molding technique may be used, wherein the post is formed and then transferred to another mold, in which the valve member material is provided to form the skirt valve around the post.

The forming of the valve and post construction in the above described manner avoids a later assembly step in the manufacture process and provides a good bond/fusion between the valve and post so as to ensure the valve member will remain correctly aligned for use. If combined with the modular post construction described above, then a highly modular system is provided in which valves are simple to construct, install and replace. In any example of the invention, the valve mounting and/or valve housing may be recyclable.

Figure 9:
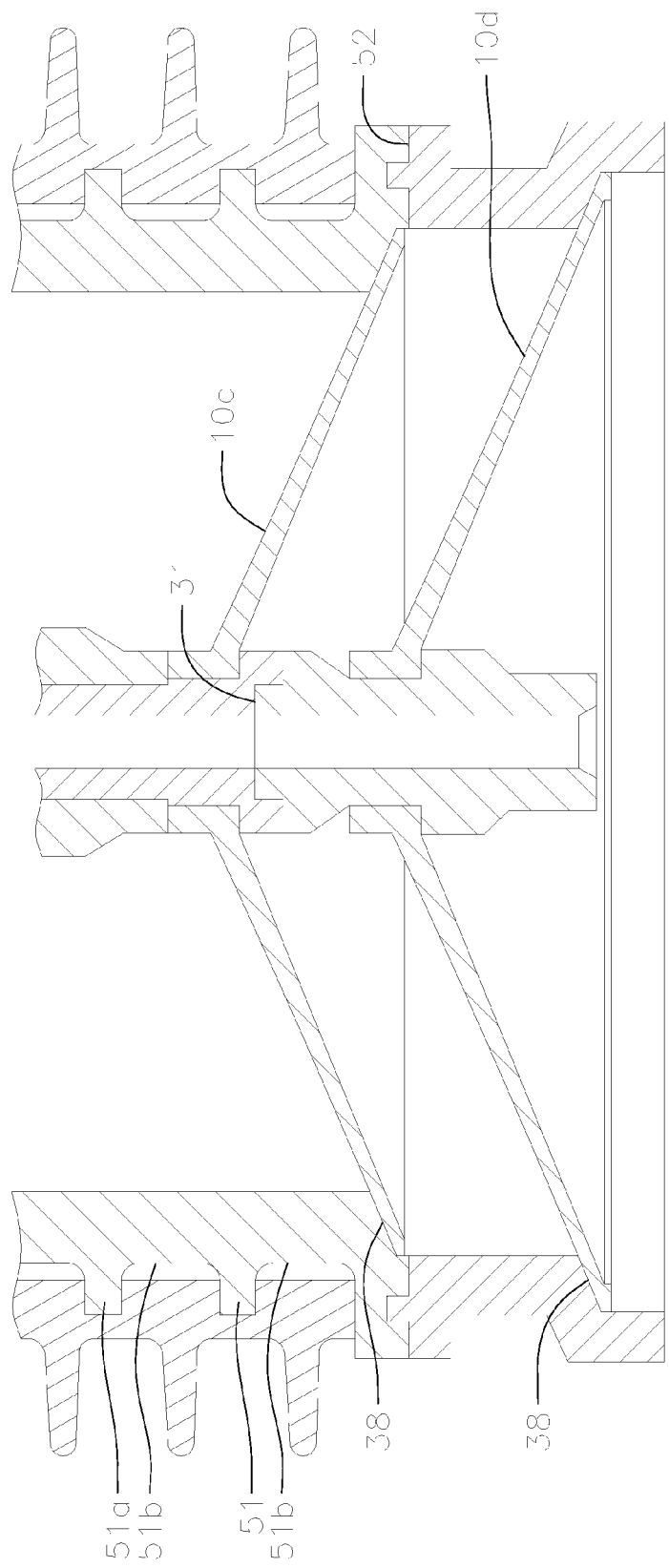
FIG. 9 shows a cross-sectional view of a partial example embodiment drain valve.

A further feature of the valve 28 of FIG. 8 is that the skirt valves 10a and 10b are each of substantially the same diameter (i.e., the same size) and may be of a common design, i.e., they also have the same geometry. In contrast, FIG. 9 shows a dual skirt valve arrangement 36, in which the skirt valves are of different diameter such that an upper skirt valve 10c is of smaller diameter than the second skirt valve 10d. Such different skirt diameters allow correct assembly and seating of the dual valves within a common housing. Thus the valve seating arrangements in FIG. 9 comprise stepped surfaces 38 at differing radii for ease of manufacture and assembly. However the control of tolerances for two different valve designs and the different resilience of each valve during operation may cause engineering complexity. In an example embodiment, the valve housing 40 allows for use of multiple valves of the same design. In other words, each valve used is identical. Thus, the same valve can be used as valve 10a or valve 10b in the shown example embodiment.

FIG. 8 shows one example of such a housing 40 which surrounds the valve mounting port 30. The housing has an internal wall or face 42 from which a plurality of valve seating surfaces 44a, 44b project radially inwardly. The valve seating surfaces 44a, 44b are generally annular in form and depend a short distance radially inwardly from the circumferential wall 42. The valve seating surfaces thus take the form of ridges or rims. The seating surfaces 44a, 44b of each ridge which opposes the adjacent valve member 10 in use is preferably obliquely angled to the wall 42. In the shown example embodiment, each seating surface is obliquely angled radially inward and upward from the wall 42. The angle of each valve seating surfaces 44a, 44b may correspond to the angle of inclination of the valve member skirt (e.g. relative to horizontal or a central axis 46 of the valve assembly).

Unlike the arrangement of FIG. 9, the seating surfaces 44a and 44b in FIG. 8 may each depend radially inwardly from a wall 42 at a common radial distance from the axis 46. In this regard, identical valves may be used to seat against each of the seating surfaces 44a, 44b.

When mounting the post 30 within the valve housing 40, the post may be pulled through the housing such that the upper valve member 10a rides over the lower surface 44b and into contact with the surface 44a, such that the lower valve member 10b can be brought into contact with surface 44b. The valve seating surfaces 44a and 44b may be spaced according to the valve member spacing on the post 30. The valve surfaces thus resist movement of the valve members in an upward direction as shown in FIG. 8 in use. This provides a significant resistance to fluid pressure within the drain and can thus prevent escape of odorous gas, as well as backflow of liquid.

It is important to the function of the housing in FIG. 8 that the projection on which the surface 44b is provided has a further surface 48b which is angled away from axis 46, i.e. which slopes or extends at an oblique or perpendicular angle to axis 46, back towards inner wall surface 42. This form of projection thus leaves a void above valve member 10b of size sufficient to allow actuation of upper valve member 10a in use. As an alternative to the surface 48b shown in FIG. 8, the angle of the surface 48b away from axis 46 could be less pronounced, for example such that the surface 48b terminates the outer edge of the above valve seating face 44a.

The forming of a ridge or ledge, i.e. an overhang, as shown in FIG. 8 within an injection molded product could be achieved by forming the housing of two half portions, which mate together to form the full circumference. Additionally or alternatively, the housing may be formed in a modular fashion to accommodate either one or two, or possibly more, valve members. In this regard a plurality of adjoining circumferential housing portions may be provided, which may be connected together to modify the housing structure according to the number of valve members to be accommodated.

Figure 10C:
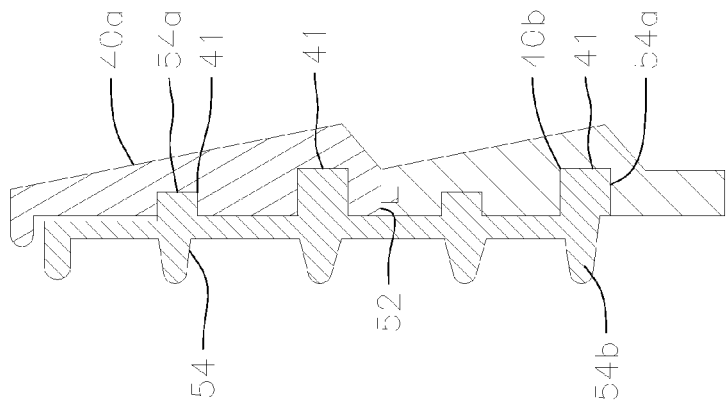
FIGS. 10a-c show section view through different possible housing wall configurations.
Figure 10B:
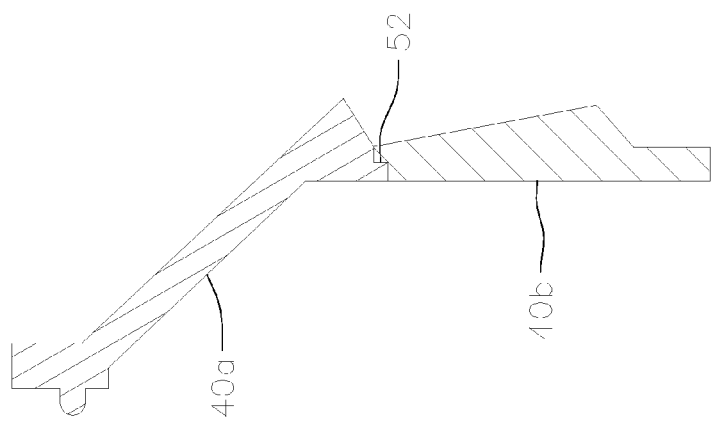
Figure 10A:
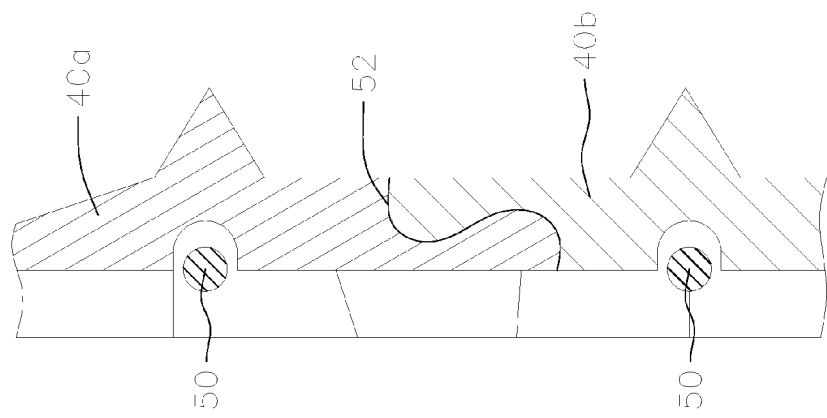

FIGS. 10a-c show different examples of a join between lower 40a and upper 40b housing portions to accommodate such a modular construction in which the first valve seating surface 44a is provided on a first/upper housing portion 40a and the second valve seating surface 44b is provided on a second/lower housing portion 40b. It is proposed that the housing may take the form of the first housing portion 40a if only one valve member 10 is required. The second housing portion 40b is provided as an optional addition to the housing 40a if a second valve member is also to be used.

The first and second housing portions meet at opposing peripheral/circumferential edges. In FIG. 10a, the housing portions comprise opposing interference-fit features. In this particular example, curved interference surfaces are provided such that a projecting portion of one engagement feature can be deformed and ride into a recesses region of the opposing engagement features so as hold the two housing portions together. Such a coupling allows the housing portions to be later detached if required. In other examples, a projection and slot arrangement may be provided or a twist-lock or threaded engagement as required.

FIGS. 10a and 10c show examples in which the housing is intended to fit closely within a cylindrical pipe, such that the housing portions mate together at interface 52 to form a cylindrical outer wall. However in FIG. 10b the first housing portion 40a is profiled so as to provide a larger diameter upper opening/mouth of the housing. The arrangement of 10b may be suited for example to larger diameter drain openings, such as in ground drains.

In the example of FIG. 10a, each housing portion comprises an individual seal member 50 mounted to an outside surface thereof. In FIG. 10c, a common seal member 54 is provided in the form of a cuff or shoulder collar, which fits closely around the housing and spans the interface 52 between the housing portions. The seal member 54 may provide a sealing gasket. The seal member 54 is an annular member and includes a plurality of spaced apart internal projections 54a that are received in complementary depressions 41. The seal member 54 also includes annular spaced apart sealing flanges 54b extending radially externally and opposite the internal projections. The seal member is stretch fitted over the housing such that the projections are fitted in the complementary depressions.

The valve housing may be customizable in a manner similar to that of the post 30 so as to provide a wholly modular drain valve system.

FIG. 9 shows another example in which a modular system is used but without requiring the valve members to be of common design. In such an example, the post may still be formed of a plurality of post portions and the housing may be formed of a plurality of housing portions. The relevant interfaces 31 and 52 are marked on FIG. 9 by way of example.

As can be seen in one example embodiment, each post portion accommodates one skirt valve and each housing portion forms a seat for such skirt valve. Thus, if two skirt valves are desired, two post portions are connected together, as for example by threading one portion into the other, as well as two housing portions. In other example embodiments, each post portion accommodates multiple skirt valves and each housing portion defines a seat for each of such multiple skirt valves. In further example embodiments, each skirt valve is integrally formed on its corresponding post.

While the above examples concern specific valve and mounting arrangements, an examples of the overall valve assembly in which such features may be used are shown in FIG. 11 onwards and described below.

Valve Housing and Support Structure

The examples of FIGS. 11a-d concern a relatively small diameter construction, for example in the region of 3-6 cm (approx. 1-2 inches) in diameter. However the construction is not limited to such a scale and the diameter thereof may be increased to suit wider drain applications.

Figure 11A:
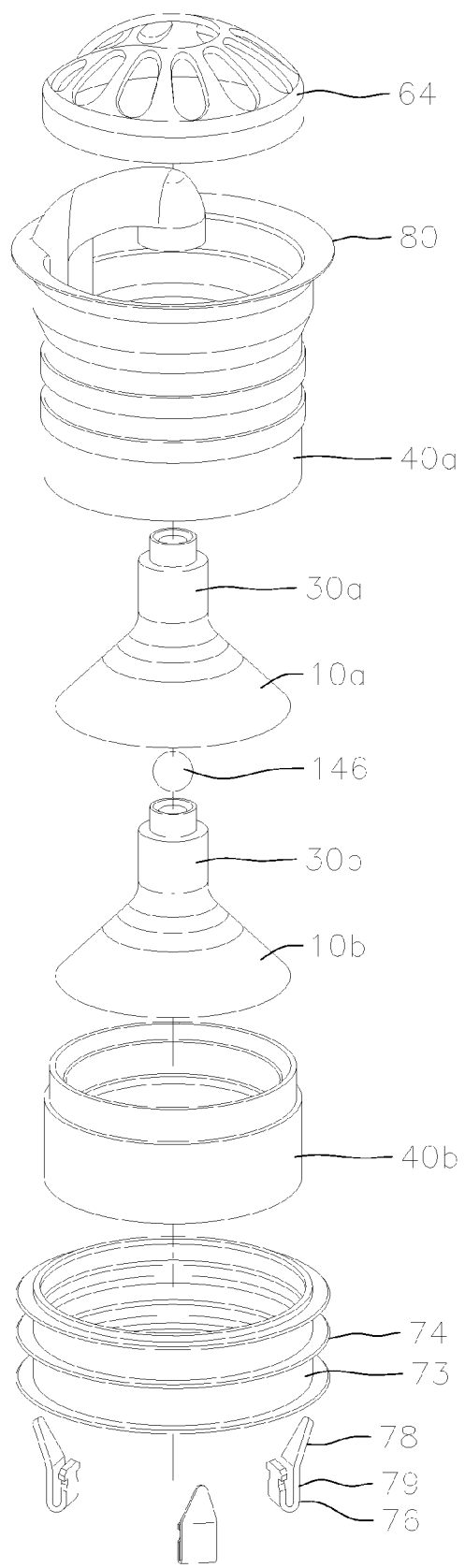

In FIGS. 11a to c, there is shown a generally tubular housing 56 configured to hold the valve members in use within a drain pipe. The housing 56 comprises a generally hollow interior into which the valve-and-post assembly described above can be inserted such that the one or more valve member 10 contacts a corresponding one or more valve seating surface on the interior face of the housing 56. The housing is formed by two housing portions (i.e., an upper portion 40a and a lower portion 40b). In alternate embodiments, the housing may be formed as a single portion. In another example embodiment, the housing may have more than two portions.

The housing 56 upper portion comprises a single strut/spoke 58 depending radially inwardly from the peripheral housing wall. The strut 58 terminates at a central portion 60 at which there is provided a connector formation for attachment to the post 30. The post in this is a two-piece post having portions 30a and 30b. The connector formation at 60 may comprise any of the engagement means described herein and may provide either a detachable or non-reversible connection with the post once assembled. In one example embodiment, the connection may be a threaded connection. In another example embodiment, it may be a bayonet type connection. The connection, as for example the threaded connection, receives the male portion (e.g., the threaded male portion 37) of the post portion 30a.

The strut 58 in this example is not perpendicular to the central axis 46 but is obliquely angled such that the central portion 60 is raised relative to the radially outer portion of the strut 58. The strut depends from an upper wall portion of the housing 56 upper portion 40a such that the central section is raised above the upper opening or mouth 62 of the housing 56 in use. For illustration purposes, the strut is referred to herein as a "raised strut".

Such a strut arrangement has been found to be beneficial in increasing the maximum available flow area at the opening 62 of the housing. The use of a single raised strut reduces the likelihood of debris being snagged on the strut in use, compared to the use of a plurality of spokes, typically three, in the prior art. Furthermore the raising of the strut removes at least a proportion of the material mass of the raised strut from the internal volume of the housing 56. Thus liquid flowing into the housing in use is presented with maximal flow area and thus minimal flow obstruction. This kind of raised strut arrangement thus differs from conventional arrangements in which struts are contained within and inside the housing, below the upper extremity of the housing wall and/or housing inlet opening/mouth.

The raised strut support arrangement thus provide low flow resistance and reduce the likelihood of clogging over time, thereby potentially increasing the life of the product and/or reducing the frequency with which the valve may require cleaning or unblocking. Somewhat counter-intuitively the inventor has found that, although a drain valve of the kind disclosed herein allows a valve to be flushed less often for sanitation, if the maximum flow rate through the valve is increased, then each flush can offer a potentially more effective cleaning action. Thus the valve constructions described herein comprise features to increase the flow rate achievable through the valve in a beneficial manner, for example so as to be closer to that of an open drain. The increased flow rate of liquid through the valve may additionally or alternatively be beneficial to ground/floor drains which may intermittently need to pass larger volumes of water as quickly as possible in response to flooding or the like. The raised profile of the one or more strut, as well as increasing the available flow are at the opening to the housing, can also increase the internal volume of the housing, thereby increasing maximum possible flow rate into and through the valve housing flow passage. Also the open flow area helps ensure that water used to clean the urinal can flow down the drain at a suitable rate, and reduces the likelihood that liquid is retained in a urinal or the like, which could potentially result in overflow over the rim.

The use of a single raised strut is also counter-intuitive since it requires strengthening of the raised strut relative to use of a plurality of weaker struts. Whilst a single strut is in many ways preferred, it is also possible to use a plurality of raised struts, each of which is obliquely angled towards a common, raised central portion, so as to reduce any flow obstruction within the interior volume of the housing. Flow obstruction and debris retention is particularly problematic, when one considers that all manner of articles can be discarded down a fluid drain, including chewing gum, coins, tooth picks, cigarette butts, hair, cloth fibers, matches, hair grips, tissue and the like.

A cover member 64 is provided over the open end 62 of the housing. The cover member may be domed in form as shown in FIG. 11a so as to accommodate the raised strut 58. Thus the strut 58 protrudes upwardly into the interior volume within the dome in use. The cover member 64 is a guard or screen member with suitable flow openings therein and serves to prevent entry of larger, unwanted articles into the housing.

The raised strut 58 in FIGS. 11a and 11b takes the form of a straight arm. However in FIGS. 11c and 11d a further development is shown in which a curved raised strut 59 is used. The curved raised strut 59 allows an even greater volume of the strut material mass to be removed from the internal volume of the housing 56. At its radially outermost, the angle formed between the curved raised strut 59 and the central axis 46 is minimal, whereas towards the center, the angle subtended between the raised strut and the axis 46 is close to, or approximately equal to, 90°.

The cover/guard 64 in any example of a raised strut may be shaped so as to receive one or more strut therein. This is particularly useful in the example of the raised strut 59 in FIGS. 11c and d such that the angle of the raised strut is not limited by the profile of the cover and may protrude above the cover. The cover may thus comprise one or more cut-outs 71 or window through which the one or more raised strut can protrude. The cut-out 71 may be shaped according to the profile of the raised strut 58 so as to closely surround the strut. The raised strut may comprise a ridge or projection (not shown) on either of both sides thereof to support/locate the cover.

The cover may be received inside the housing 56, e.g. in the example of FIG. 11a-d or else may surround the outer wall of the housing.

A sleeve of resilient material 73 is provided, such as a silicone rubber or other suitable elastomeric material that is resistant to degradation. The sleeve is retained on the outer surface of the housing 56 by one or more grooves or ridges 69 of the type described above in relation to FIG. 11b. The sleeve includes one or more projections that are received in the grooves 69. The sleeve comprises a collar portion which surrounds the housing 56 and a plurality of peripheral sealing flanges 74 spaced in an axial direction, which depend outwardly from the collar. The sleeve may provide a sealing gasket formation.

The plurality of sealing flanges 74 are important in securing the housing within the urinal fixture drain pipe or floor drain housing. Thus, two flanges or more provide a benefit over a single flange which would permit some degree of misalignment of the housing in the drain pipe, particularly if product tolerance means that the housing 56 is not a tight fit. However three or more spaced flanges 73 of various sizes (e.g., diameters) provide greater assurance of fitment and may be preferred in some examples of use.

Returning to FIG. 9, there is shown a further example of a sealing sleeve arrangement provided around a housing of larger diameter of the kind that may be suitable for use as a floor drain. It can be seen that the outer peripheral wall of the housing comprises a plurality of projecting annular ridges 51*a* which are arranged to cooperate with a plurality of corresponding annular grooves 51*b* within the seal collar. Such features serve to hold the sealing sleeve in place on the housing of FIG. 9 also. The sleeve is stretch fitted over the housing such that the annular ridges 51*a* are received in corresponding annular grooves 51*b*. While co-operating ridges and grooves are described as a particular example herein, there is also the possibility that other forms of surface texturing/profiling of the housing outer surface could be used or else the provision of an adhesive at the interface between the housing and sleeve.

In any example, it is envisaged that a plurality of spaced seals can be provided at spaced locations in the axial direction either by provision of a common collar arrangement that extends in the axial direction or else by provision of a plurality of individual seals, such as simple O-rings or the like, each of which is retained in a groove of the like on the housing body.

In FIGS. 11*a* and 11*c*, there is also shown an additional retaining/alignment member in the form of one or more barb 76 provided at the lower end of the housing. The barb takes the form of a metal or plastic member that is retained against the housing and comprises an outwardly sloping or obliquely angled portion 78 extending from a generally vertical portion 79. The angled portion extends upwardly at a preferred angle of 115° degree, however other angles are contemplated i.e. towards the upper end or opening 62 of the housing and radially outward. The orientation of the angled barb end 76 readily allows the barb to flex upon insertion of the housing 56 into a drain pipe or outer housing. Once inserted the barb typically retains its deflected state, pressed against the opposing drain pipe/housing inner surface. However the barb does not so freely permit retraction of the housing do to vandalism since the direction of the force applied to remove the housing opposes the barb and causes the barb to at least partially dig into the opposing surface. Barbs of this kind can thus resiliently hold the housing in its intended location but can generally be overcome by a suitable force with a special tool without significant damage to the surrounding drain pipe/housing.

The use of a plurality of barbs 76, such as three or more barbs as shown in FIG. 11*c*, spaced about the perimeter of the housing also provide a further alignment feature by deflecting the housing away from the adjacent internal wall of the surrounding pipe/housing.

The barb 76 may comprise a strip of metal which is bent to shape. One end of the barb may be retained within the material of the housing 56 or within a specifically shaped recess therein, with the other end of the barb being free to deflect as described above. The angled portion 78 of the barb, i.e. the barb end, may be tapered towards its free end, which may be pointed or rounded as required. In another example embodiment, the barb 76 may be formed integrally with the housing.

In FIGS. 11*c-d*, the housing 56 also comprises a rim or flange feature 80 protruding radially about its upper end. This ensures that the housing cannot slip down a drain pipe opening beyond its intended depth and may also provide a close flush fitment with the drain opening.

In example embodiments, the valve shown in FIGS. 11*a* to 11*d* may be inserted into a housing such as a threaded housing, which may then be threaded into the drain. Alternatively, the drain valve shown in FIGS. 11*a* to 11*d* may be directly inserted into a drain.

Turning now to FIG. 12, there is shown an example of a combination drain and valve housing assembly 82 to accommodate a different type of drain, typically a drain of larger diameter, such as a ground drain. Whilst a single valve member arrangement is shown in this example, it will be appreciated that a dual valve arrangement could be accommodated using any of the post and/or housing features described above.

In this example, the drain cover 84 takes the form of a grate or guard with opening to allow flow to the drain. The cover 84 is generally planar in form and may be formed of metal or plastic according to requirements. The post 86 and valve member 88 are as described above, as well as the internal features of the housing member 90 to provide the desired seating arrangement for the valve member 88. Those features will not be described again for conciseness.

However in this drain assembly, the housing 90 does not comprise a support strut for the post 86. Instead the post 86 is supported by the drain cover 84. The cover is provided with one or more engagement formations 92, typically at its center, for attachment to one or more corresponding engagement formations 94 on the post 86. The drain cover 84 and post 86 preferably comprise opposing male and female connector portions so as to ensure correct orientation of the post in use, typically such that the post axis is perpendicular to the cover in use. In this example, the post engagement formations 94 comprise a male end projection which is inserted into a recess/opening defining engagement formation 92 in the cover. The engagement formations comprise screw threads but may otherwise comprise a bayonet or twist-lock fitting, a friction fit, or an interference, push-fit or snap-fit connection.

It is preferred that a releasable engagement between the post and cover 84 is achieved so as to allow removal/replacement of the post 86 during maintenance of the drain valve assembly 82.

The cover 84 comprises a perforated region 84*a*, in which flow openings are provided. The region 84*a* surrounds the central engagement formation 92 and extends in a radial direction towards the perimeter such that it spans a majority of the radial distance of the cover. Depending on strength requirements, the perforated section may comprise solid radial strut/arm formations extending towards the central engagement formation 92. A solid perimeter or border section 84*b* is annular in form and surrounds the perforated region 84*a*, so as to provide a section by which the cover can be mounted to the drain.

The drain cover comprises openings 95 spaced about its perimeter section 84*b* to allow the drain cover to be fixed in place over the drain using conventional fasteners, such as bolts.

The drain cover also comprises one or more mounting formations for mounting the valve housing 90 to the cover 84. In this example, a plurality of mounting formations 96 is provided at angular spacings about the cover center, typically on the underside of the cover. In other examples, it is possible that mounting formations could be located within the material of the cover or within one or more of the flow openings therein.

In an example embodiment, the mounting formations 96 each comprise a projection depending from the cover. The projection takes the form of a partial wall, having a recess 98 therein. The recess 98 is slot-like, extends circumferentially and opens at one edge of the partial wall. The recesses in each projection are aligned and face in the same direction.

The housing 90 comprises a plurality of cooperating projections in the form of lugs 100. The number of lugs 100 and the angular spacing thereof matches that of the cover projections 96. Thus, in use the housing can be located against the underside of the cover and twisted such that the lugs 100 each pass into and engage a corresponding recess 98 so as to releasably lock the housing 90 onto the cover 84. Thus unlike the other examples above, the housing in this example is also supported in the drain by the cover.

When attached to the cover, the upper rim 102 of housing 90 is held against the surface of the cover, typically against the perimeter section 48b. This the peripheral edge 102 of the housing 90 surrounds the perforated section 84a so as to direct any liquid flowing through the perforated section 84a into the drain. The housing 90 in this embodiment thus does not need to be supported by, or seal with, the interior wall of the drain and can be suspended from the drain cover 84.

The upper portion of the housing 90 towards the rim 102 may be flared such that the housing opening at the rim 102 is of greater diameter than the housing in the region of the valve seat(s), which is typically generally tubular in shape.

Figure 13:
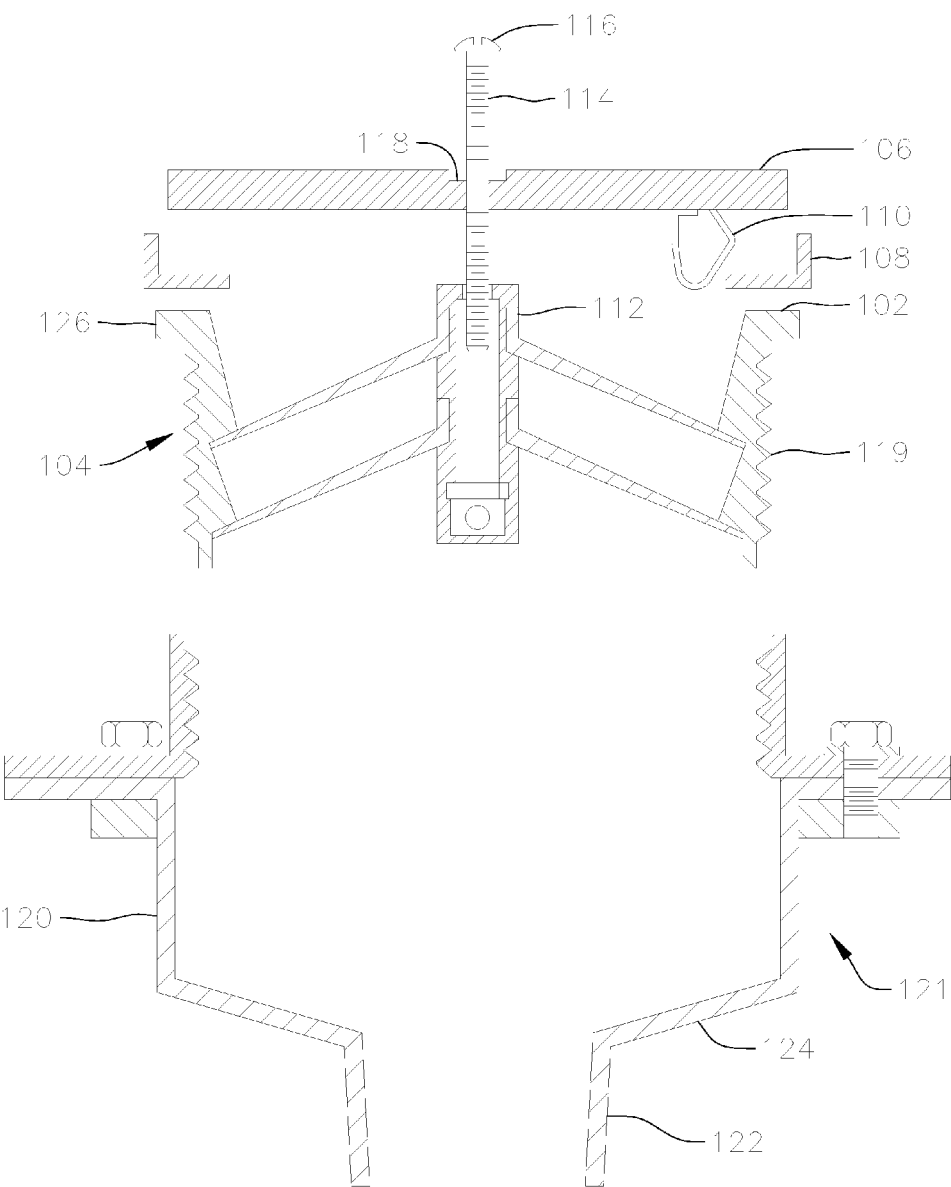
FIG. 13 shows a cross section view through a further drain valve housing.

Turning now to FIG. 13, there is shown another example of a drain valve assembly in which valve housing 104 is attached to a drain cover 106 by an intermediate connection member 108. The member 108 may be annular in form and may be affixed to the upper rim 102 of the housing. The member 108 may be arranged to protrude, e.g. radially inwardly beyond the rim 102 so as to define a flange formation which can be gripped against the cover member to hold the housing on the cover in use.

In the example of FIG. 13, a resilient coupling formation 110 is used to hold the member 108 against the cover 106, such as a spring clip. The clip is bent so as to define a protrusion over which the member 108 can ride in a first direction towards the cover 106. The clip resists separation of the member, and hence the housing, from the cover unless sufficient force is applied to pull the housing and cover apart. Other suitable latching means may be used.

The post 112 in this example is held on the cover 106 by a fastener in the form of bolt 114 passing through the cover and into an opening in the upper end of the post. A head 116 of the bolt may be received in a recess 118 in the upper surface of the cover. Accordingly the head 116 may be sunk within the profile of the cover whilst still allowing access for releasing the post. The post and associated valve members may be attached to the bolt 114, and thereby the cover 106 prior to mounting in the drain support.

The example of FIG. 13 differs from that of FIG. 12 in that the housing 104 is mounted in, and supported by, the structure 121 of the drain rather than the cover. Thus only a relatively weak coupling between the cover and housing 104 is required to suitably position the cover on the housing in use. In this regard, the housing 104 comprises threaded engagement formations about its outer peripheral wall 119. A finish ring 108 may be used for anchoring screen cover 108 to the housing 126. The ring may be fastened to the housing 116 with screws (not shown). In FIG. 13, the drain support structure 121 comprises a wider, upper mouth region 120, leading to a narrower neck region 122. Thus the mouth and neck region are separated by an intervening wall section 124. The housing 104 is dimensioned to fit within the wider mouth region 120. In such a bespoke drain construction, a flange 126 may be provided at the upper rim 102 of the housing in order to anchor the finish floor drain housing ring 108 with screen 106. This is particularly important for anchoring post 112 to screen 106 with screw 116.

In other examples of use of a floor/ground drain, the drain valve may be required to be sunk in a vault below the surface of the ground. Furthermore, particularly for retrofit applications, where a bespoke drain opening is not possible, it may be necessary to insert the drain valve housing part way down a drain. In such examples, a housing of the kind shown in FIGS. 8 to 11 may be used, in which the valve members and post are supported by one or more raised strut/spoke on the valve housing.

Figure 14:
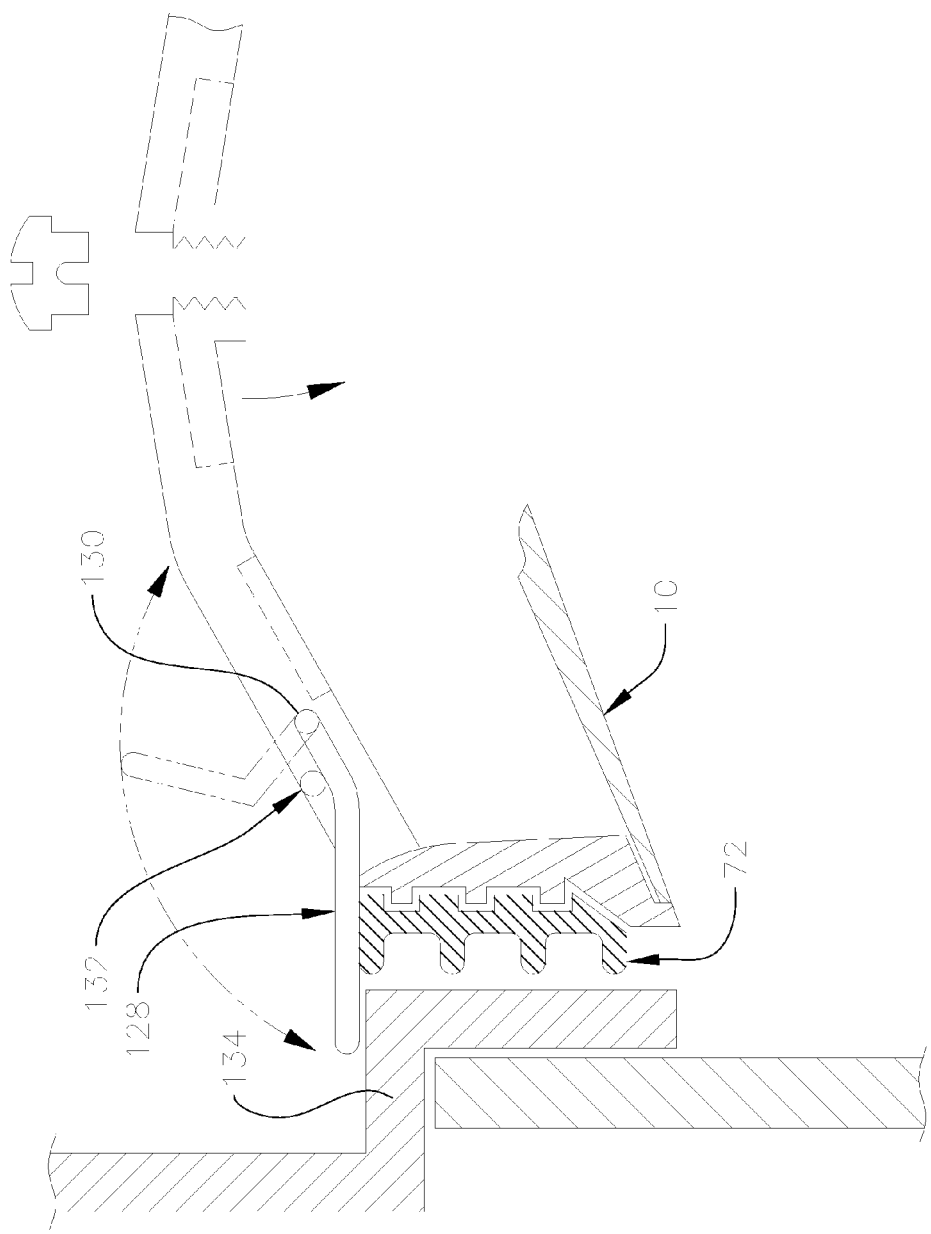
FIG. 14 shows a partial section view of a retaining clip for a drain valve housing.

In FIG. 14, there is shown a modification to the valve housing to accommodate a clip or latch feature 128. The clip 128 is hingedly mounted to an upper region of the valve housing, for example to the outer peripheral wall or else to a strut or spoke. The clip may comprise a lug portion 130, and typically two opposing lugs 130, for insertion into corresponding opening(s) in the housing such that the clip 128 can hinge between a deployed condition, in which the clip 128 protrudes beyond the perimeter of the valve housing, and a retracted condition, in which the clip is within the housing perimeter. In the example of FIG. 14, the clip 128 is upstanding when retracted and is lowered to a radial orientation when deployed.

The clip is angled part way along its length, for example to provide an elbow formation. This may help the clip achieve its radial/horizontal orientation at its outer end and may help reduce the leverage on the node when deployed.

When deployed, the clip 128 is resiliently held in the deployed condition. This is achieved in this example by a node/projection (e.g. a preventer) 132 in the path of the clip between the retracted and deployed conditions. The node 132 may be rounded in form such that the clip 128 can be resiliently deformed as it is pushed past the node 132 into the deployed condition. However the node will resist movement of the clip to the retracted condition until sufficient force is provided at the free end of the clip. The resistive force is greater than the weight of the valve housing such that the clip will remain deployed when the housing is located in position in a drain unless acted upon by an external force. A ground drain housing typically comprises a ledge formation of the kind shown at 134 in FIG. 14, where an upper drain opening meets a narrower drain pipe. The clip thus beneficially rests on such a ledge feature when deployed. Thus the clip can be raised to allow insertion and retrieval of the housing within the drain but will hold the housing at the desired level within a drain in use.

In other examples, where the drain valve housing is not intended to be inserted part way down a drain housing/pipe, but is instead located at the drain opening, the clip formation could be provided in place of a peripheral flange if preferred. The clip provides a low cost feature that is simple to manufacture and does not cause any significant flow obstruction or site at which debris can build up. In further example embodiments, the housing may comprise a light-emitting, e.g., luminescent, material. The light-emitting material may absorb light energy when irradiated/illuminated such that it can be seen to glow by an observer when the ambient light level is lower. The material could be a polymer having one or more active, light-emitting ingredient. A chemically/biologically inert material may be used, such as, for example Strontium Aluminate.

Venting System

Figure 15:
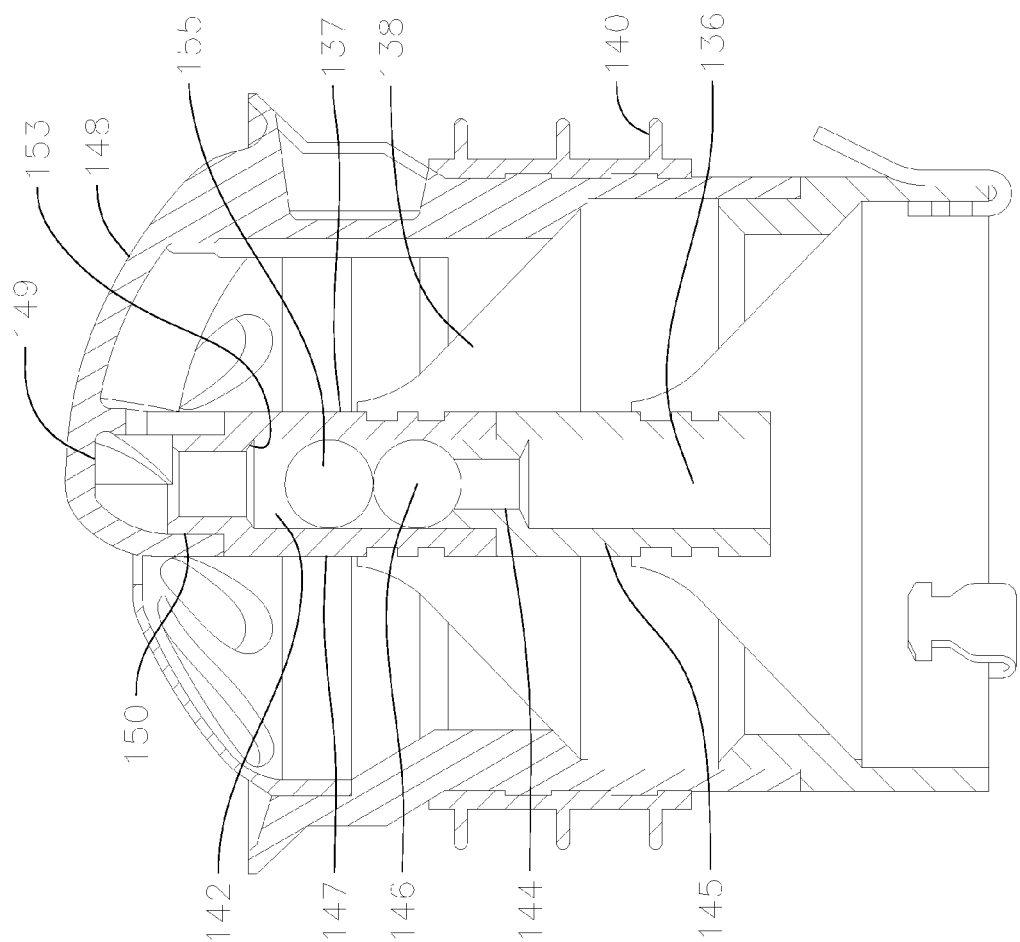
FIG. 15 shows a cross section view through an example of a drain valve venting system.
Figure 16:
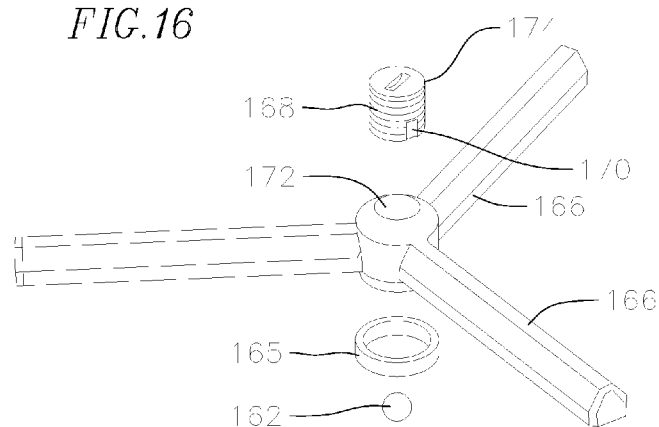
FIG. 16 shows a perspective exploded view of a further drain valve venting system.

In FIGS. 15 and 16, there are shown valve venting systems which may be applied to any of the drain valve devices disclosed herein. Such systems allow bypassing of the main valve member(s) via a bypass gas flow passage.

In the example of FIG. 15, there is provided a valve support in the form of post 137 having a hollow interior so as to provide a gas venting passage 136. A gas venting passage is particularly beneficial in relieving excess pressure that can build within a drain due to the nature of the seal formed by the valve members 138 and peripheral sealing gasket 140. Thus, without such a gas vent, the valve device effectively seals the drain. Back pressure acting on the valves 138, can resist opening of the valves to allow liquid flow down the drain. However if a vent is left entirely open, then odor and other unwanted airborne contaminants can escape from the drain. Therefore a valve venting system is proposed.

In FIG. 15, the post 137 comprises a first internal passage region 142 of greater width and a second region 144 of reduced internal passage width. Thus the internal passage comprises a restriction or neck feature defined by the second region 144. The restriction provides a seat for a valve member 146, such that, when seated, the valve member 146 blocks the internal flow passage at the second region or restriction 144. In an example embodiment, the valve member may be spherical (i.e., a ball) or cylindrical.

In this example, the valve post is formed of two post members and the flow restriction can be formed where a lower post member 145 has a portion that is inserted into the upper post member 147. In the shown example embodiment, the restriction 144 is formed on the lower post member and inserted into the upper post member. The open end of the first post member is wide enough to receive the valve member 146. In other example, in which a single post member is provided, the post may be provided with an end cap after insertion of the valve member so as to retain the valve member 146. The cap may comprise a portion extending into the post such that the valve member is elevated above the lower end of the post. Otherwise a valve seat may be integrally formed within the post part way along its length.

The valve member 146 in this example comprises a ball but an alternative displaceable member could be provided as long as they can be correctly seated in the closed condition and offer a suitable mass to be displaced by valve actuation as will be discussed below.

The upper end of the post 137 is connected to raised strut 148 via a hollow connector end 149 formed on the strut 148 such that the gas flow passage 136 communicates with the strut. The strut 148 is hollow in form a thus allows passage of gas therethrough so as to provide an outlet for gas/vapor emanating from the drain. In an example embodiment, the raised strut 148 has an opening, or is entirely open on its underside to allow escape of gas/vapor to the surrounding air. Thus the gas outlet is downwardly facing in use. The post is removably connected to the raised strut, as for example by threading, to allow for easier replacement or servicing of the post if necessary.

The outlet of gas via the underside of raised strut 148 is advantageous since the strut shields the outlet from ingress of debris in use, thereby maintaining the outlet open as far as possible. Furthermore, when coupled with the raised geometry of the strut, the gas vent outlet may be less prone to blockage by debris trapped within the body of the valve or build-up of dirt since it is elevated above the height of the housing. Also, the raised strut helps to ensure that under normal conditions, the gas vent is not subjected to ingress of liquid or liquid borne contaminants could inhibit correct operation of the gas vent valve member 146. The provision of a raised vent valve outlet within a drain valve represents one particular variant, for which the inventor has coined the name "snorkel valve" or "snorkel vent".

During normal operation, the vent valve 146 rests on the neck portion 144 within the flow passage 136 and thus prevents escape of gas. The weight of the vent valve member is tailored such that upon elevation of pressure within the drain to a predetermined level, the vent valve member will be lifted off its seat and will allow escape of gas until the pressure drop is sufficient to allow the valve member 146 to fall back onto its seat under its own weight. The weight of the ball or cylinder can be tailored to allow pressure venting at an internal drain pressure which is less than the pressure required to dislodge the housing from the drain.

Figure 18C:
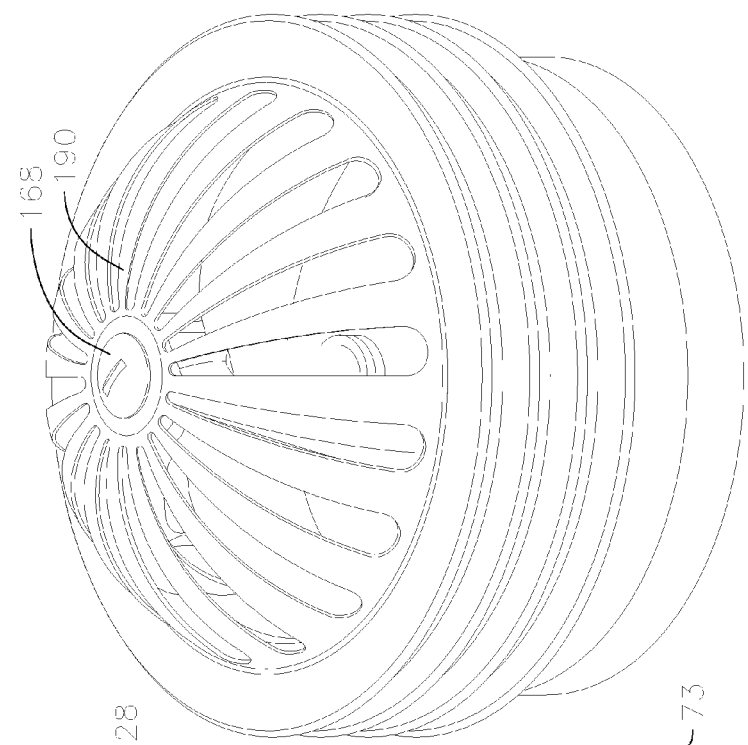

In one example, the venting valve member 146 may be of density sufficient to allow the valve member to be buoyant. Thus in the event that the level of liquid in the drain rises sufficiently high to cause backflow from the drain, the valve member 146 will float and thereby rise to engage an upper valve seat 153 formed by a second passage restriction or neck formation 150 above the valve blocking flow through the post and to the strut. In other example embodiments, the upper valve seat 153 may be formed on a separate restriction 159 formed within the flow passage (FIGS. 8 and 18a). The separate restriction 159 may be a conduit adhered to or otherwise formed within the flow passage.

In this manner the vent valve can also offer drain backflow protection. In other embodiments in which it is preferred to have a heavier venting valve member to provide a greater level of resistance to gas escape from the drain, a further, typically lighter valve member 155 could be provided in order to facilitate the above described backflow protection. The further valve member could be provided atop the first valve member such that it is free to float upon rising liquid levels within the flow passage 136. The further valve member could be a lightweight ball of the same or different diameter to the first member 146.

Figure 17:
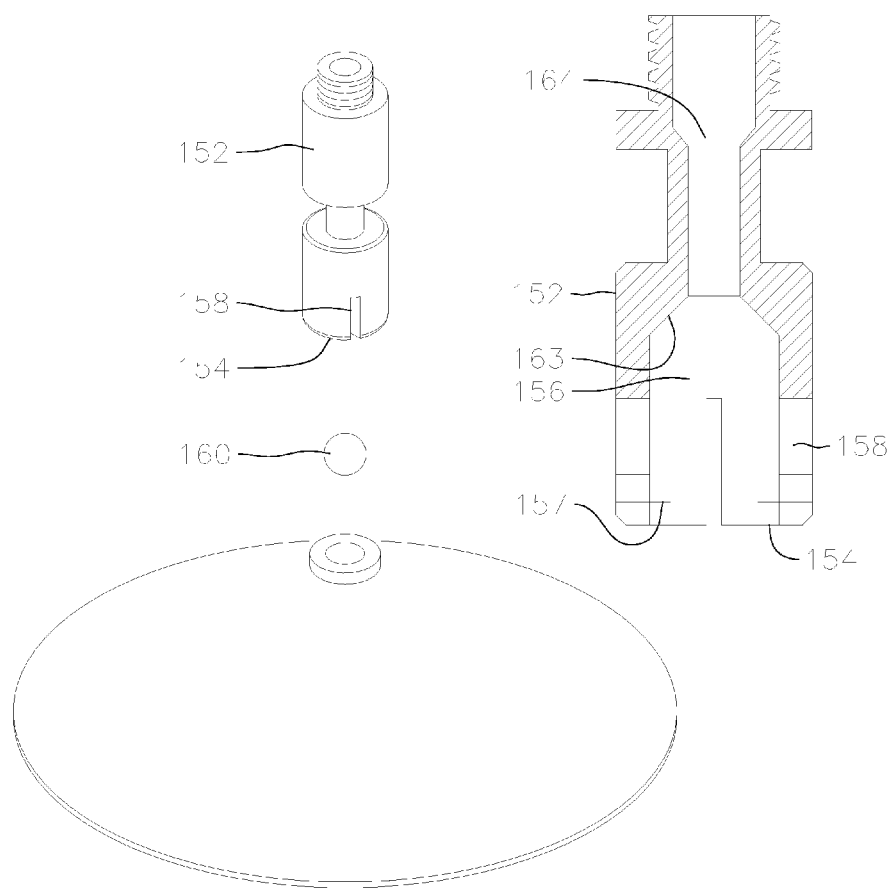
FIG. 17 shows a section view through a valve member support for use in venting floor or urinal drain valves.

Turning now to FIGS. 16 and 17, an alternative gas venting construction is shown. In this example the post 152 is substantially as described above save that the lower end comprises an opening 154 configured to allow insertion of a valve member into the internal flow passage 156 without the need for a cap member. In this example, an inwardly projecting lip 157 is provided about at the opening to retain a valve member in the passage 156 once inserted. The post also comprises one or more slot 158, typically two or more slots, in its side wall, leading to the opening 154. Thus the walls of the post can be deformed slightly to enlarge the opening upon insertion of the valve member 160, e.g. by flexing of the side walls. Once inserted, the side walls will flex back to trap the valve member 160.

This example also shows a two valve member configuration, of which the lower valve member is the lighter member 160. The gas venting member 162 is located above the member 160 on a separate valve seat 164. The venting ball 162 is smaller than the member 160 in this example.

As can be seen in FIG. 17, the valve seats within the post have angled an inclined contact surface (i.e. an annular valve seat surface) 163 so as to offer a good sealing engagement with the respective actuable ball valve.

The post of FIG. 17 provides a unitary post construction which is easy to manufacture whilst also accommodating multiple valve members. A sealing ring 165 may be provided at the interface between the post 152 and the strut member 166.

The examples of FIGS. 16 and 18 demonstrate that the vent system can be applied to different raised strut arrangements to that shown in FIG. 15. In such examples one or more raised strut 166 may be hollow and/or comprise a recess on its underside to allow escape of gas from the drain.

In FIGS. 16 and 18, there is shown a vent control member 168 to allow a user to manually select a desired vent setting. The vent control member comprises a grub screw in this example but could comprise another rotatable insert into the strut member 166 in other embodiments.

The vent control member 168 has a directional channel or groove 170 on its underside. The vent control member has a slot 174 on its upper end. When located in the connector portion 172 (i.e. the recess) of the strut member 166, the control member 168 can be rotated via the slot 174 to select the angular orientation of the channel 170. Thus the channel 170 can be selectively aligned or misaligned with a channel in a strut 166 so as to control selective opening and closing of the gas vent.

In FIG. 18*a*, there is shown the option of a seal 175 about the vent control member 168 to seal with the corresponding recess/opening in the strut 166. This may help ensure unwanted gas is not allowed to escape, particularly when the vent control member is closed off.

This allows an end user to open or close the vent passage as required, for example using manual tool, such as a screw driver or tamper resistant screw geometry. Depending on the shape of the channel 170, the degree of opening, and thereby the maximum gas flow rate through the vent may also be adjusted. FIGS. 18*a* and 18*b* shows on the right hand side some different end profiles (i.e. channel shapes) of the vent control member 168 which may be used depending on the number of vent openings and/or struts to be accommodated. In the event that a plurality of struts 166 and/or recesses 167 are provided, the vent control member may have channel formations 170 suitable to vent through any or all available openings simultaneously. Thus the channel examples 170*a-c* show channel formations that could accommodate one, two or three vent openings respectively.

Indicia may be provided on the strut 166 to confirm the different control orientations of the member 174. The manual adjustment of the vent control member is beneficial in that it allows the vent to be overridden or adjusted for a particular drain installation. The use of a formation on the vent control member that is actuable by a tool is advantageous in that it avoids the need for direct contact with the control member.

The vent control feature may be applied to any example of drain valve housing or support structure disclosed herein. In the example of a floor drain of the kind shown in FIGS. 12 and 13, for which the post is mounted on a drain cover rather than a raised strut, the vent outlet may be provided on an underside of the drain cover, for example by way of an opening in the side of the post or else through the central aperture in the drain cover. A vent control member could thus be provided in the central aperture for example by providing a member having a flow opening within the vent passage immediately below the vent control member. A channel through the control member could be selectively aligned with the opening to select a vent condition of the system in the manner described above. In another example, a further post member could be mounted on the upward side of the drain cover and could have an outlet that is thereby raised above the drain cover.

In FIGS. 19*a* and 19*b*, a further development of the snorkel vent concept is shown in which a venting post 180 depends upwardly from the strut. The post may have any of the vent control or vent valve features disclosed herein, such as one or more vent valve members disposed within the post (although omitted from the figure) and/or a manually adjustable vent control member. The post also has one or more flow passage portion 178 protruding radially outwardly from the post, in the form of an overhang. An overhang 176 may take the form of a circumferential head formation (e.g. in the shape of a mushroom head) or else a plurality of outwardly depending passages. The underside of the overhang formation is open, so as to form open recesses 167, thereby allowing vented gases to pass into the surrounding air.

The venting post of FIGS. 19*a* and 19*b* allows a gas vent outlet to be raised in the manner of a snorkel instead of, or in addition to, the provision of a raised strut as described herein. The venting post of FIGS. 19*a* and 19*b* allows any drain valve assembly described herein to be adapted to allow a high flow regime without jeopardizing the venting function of the drain valve. Such a venting post may be connected under a drain cover or drain valve housing using any of the engagement means disclosed herein. In one example embodiment, the venting post has a length of at least one inch. In another example embodiment, the venting post has a length in the range of one to three inches. In a further example embodiment, the venting post raises the location of the venting by one to three inches. In another example embodiment, the venting post raises the location of venting by at least one inch. This embodiment allows for the drain valve to be installed deeper in a drain vault, while at the same time allowing for venting of a location above the drain. This will prevent the valve from clogging or fluttering which may occur from occasional and rapid drain flow. In example embodiments, multiple venting posts may be coupled one over the other to further raise the location of venting. Each venting post for example may have a threaded or bayonet type of male connector 181 opposite a female threaded or bayonet connection 183 at an opposite end. The male and female connection may be sized such that the male connector of one vent post may be connected into the female connector of another vent post. In the example embodiment shown in FIG. 18*a*, the male connector 181 of the vent post is connected into the strut 166.

While the above examples of venting systems all concern the provision of a venting flow passage though a central post, it will be appreciated that different possible types of drain valve construction may lend themselves to alternative vent passage arrangements. For example, in the event that a duckbill valve is used instead of a skirt valve(s) disclosed herein, it may be preferable to mount the vent flow passage to one side of the housing rather than centrally. Thus the vent passage could be located out of the flow passage in a region immediately adjacent to the housing wall, e.g. within a formation used to support such alternative valve types. For a duckbill valve arrangement, a central vent passage may be particularly undesirable and so the vent passage could run up an external wall or cavity of the housing, e.g. so as to bypass the main liquid flow valve in the housing.

Figure 20:
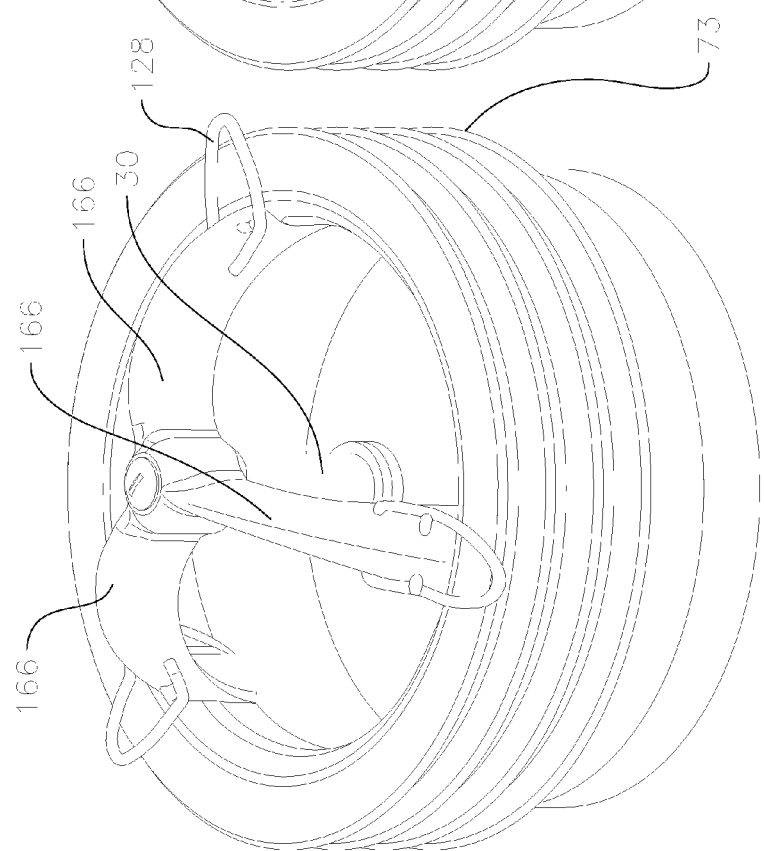
FIG. 20 is perspective view of an example embodiment valve including an example embodiment perforated cover.
Figure 21:
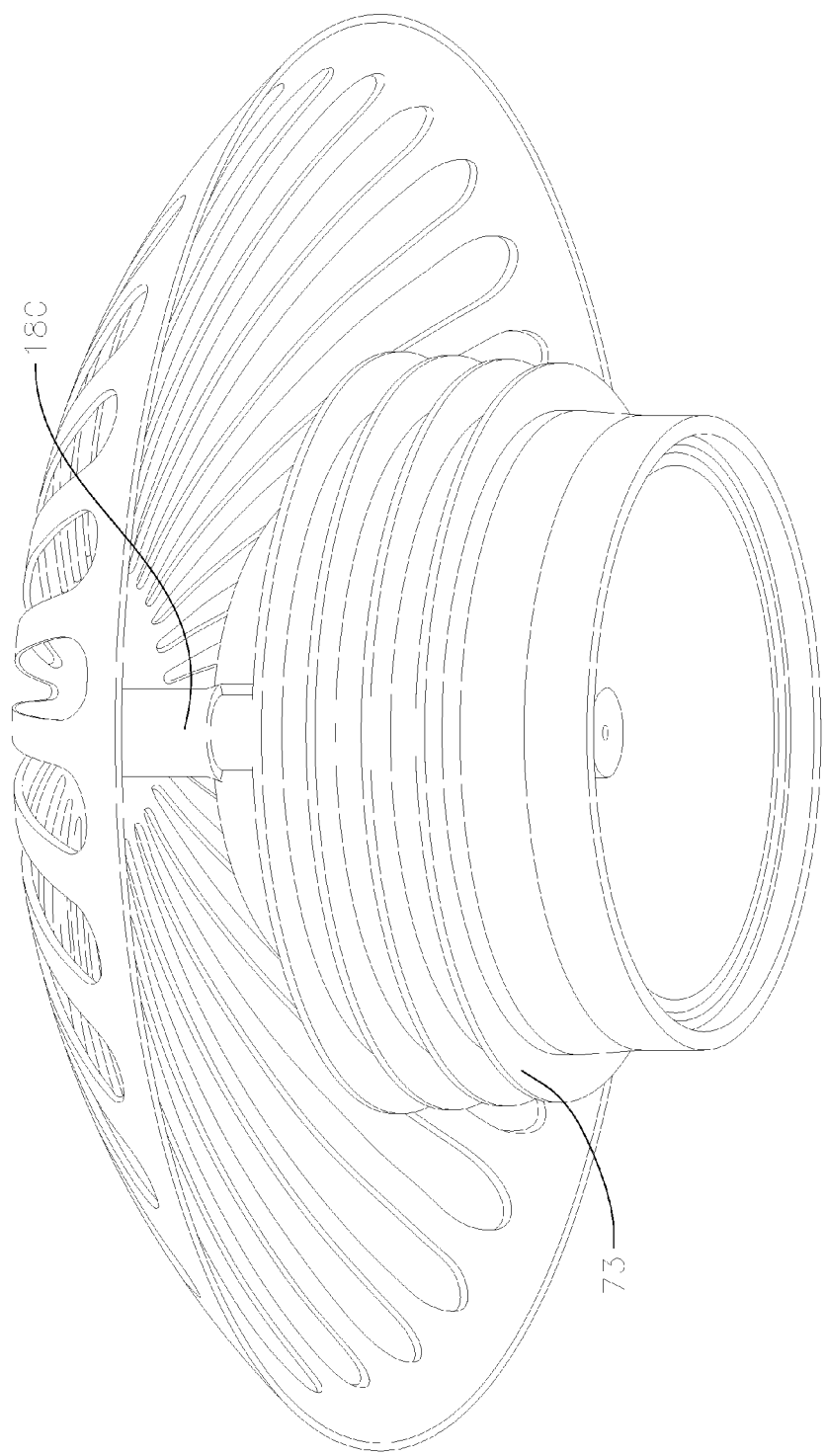
FIG. 21 is a perspective view of an example embodiment drain valve including an oversized perforated cover.

In another example embodiment as shown in FIG. 20, a perforated cover 190 may be fitted over any of the aforementioned embodiment valves. For example a cover 190 may be fitted over the "snorkel" valve shown in FIG. 18*a*. The perforated cover may be dome shaped so as to fit over the strut members 166. The perforated cover in the shown example embodiment is held in place with the vent control member 168. In another example embodiment, the perforated cover may be held in place with the venting post 180. An oversized perforated cover 190 extending beyond the diameter of the drain valve may also be used. The perforated cover, especially oversized perforated cover as shown in FIG. 21, is desired in drain applications with higher debris such as in sports stadiums where debris such peanut shells, bottle lids and the like are plentiful. The oversized cover member may be mounted over the venting post 180.

In another example embodiment, a vent with or without a snorkel may be incorporated in a duckbill valve type of drain. As shown in FIG. 22, the valve includes a housing 40 similar to the housings described in relation to the other embodiments which may include a sealing member such as a sleeve or annular sealing member 73 having sealing flanges 74 or may incorporate another type of seal such as an O-ring seal 75. It is noted that in an example embodiment disclosed in FIG. 21, both a sealing gasket and an O-ring are disclosed. However, in an example embodiment, the housing would incorporate one or the other. A gas venting passage 136 is formed on one side of the housing. A strut 58 forming a snorkel may extend from the gas venting channel. A vent switch, such as vent switch 168 may be also incorporated to turn the vent on and off as necessary. If a vent switch is incorporated then the venting will only though the vent switch. In other word, the strut will not have an opening on its underside to allow for venting. The duckbill valve 200 has a mouth 202 formed around a flexible retaining ring 204. Once the retaining ring is placed within the housing 40, it expands such that it engages the inner perimeter 206 of the housing, as well as the outer surface 208 of the gas venting passage. The duckbill valve tapers from its mouth 202 to a bill 210. As liquid enters the drain, it will enter the duckbill valve mouth and travel to the bill which would expand to allow the flow to drain downwards. After the flow is completed, the bill 210 collapses to its collapsed shape preventing gases and fluids from coming up. The venting passage will allow venting of gases as necessary. The valve housing may include one or more barbs 76. The venting passage can a multi-section passage as for example the passage shown in FIG. 18 and may include the valve members or balls 145, 146. The housing may also be a multiple section housing as for example shown in FIG. 18a. The venting passage can also be any other example embodiment venting passage disclosed herein as for example the venting passage disclosed in FIG. 17. The housing may also include one or more clips or latch features 128 as shown in FIG. 18 a, for retaining the drain above the drain hole into which it is inserted. Moreover one or more clips 128 with preventers 132 (as shown in FIG. 18a) may be incorporated with this embodiment and for example coupled to the strut 58.

A hydrophobic coating is a nanoscopic surface layer that repels water. In any of the aforementioned example embodiments, the valve housing and all the valve members, such as the valve skirt membranes, may be coated with a hydrophobic coating. An example hydrophobic coating is formed from a fluorinated reactant having from about 3 to about 20 carbon atoms and at least one terminal trifluoromethyl group polymer. Applicant has discovered that use of hydrophobic coatings prevents the built up of undesirable struvite on the coated surfaces. As a result, mold built-up is prevented or minimized and odors emulating from the valve are also reduced.

In other example embodiments, a numerical or electronic chip may be incorporated in the above-mentioned example embodiment valves. For example, the chip may be placed underneath the raised strut, or on a side of the post, or the housing. The chip may be of the type that requires no battery and can be interrogated by a scanner that may be pointed towards it or that may be in the vicinity of the chip. Once interrogated by the scanner, the chip may be able to provide information to the scanner of when it was stalled, where it was manufactured, when it was purchased, when the warrantee of the drain valve expires, as well as any other information stored on the chip.

As can be seen, the example embodiment drain valves of the present invention may be used with waterless urinals or almost waterless urinals. The example embodiment valves are waterless valves or almost waterless valves in that they allow for fluids to drain, while at the same time preventing odors from the drain emulating upwards into the atmosphere without flushing any water, or by flushing a small amount of water, or by flushing intermittently. In other words, when the example embodiment drain valves are used, the urinal does not have to be flushed at all, or may have to be flushed after predetermined time intervals, or after a predetermined number of uses.

The terms "upper" and "lower" as used herein are relative terms to denote the relative position between two objects and not the exact position of two objects. For example, an upper object may be lower than a lower object. Moreover, in embodiments where the male member of a first object is received into a female member of a second object, it should be understood that in alternate embodiment, the first object may have a female member instead of a male member, and the second object may have a male member instead of a female member, which is received on the female member of the first object.

Various modifications and alternative arrangements will become apparent to the skilled person based on the disclosures made herein. Such changes are to be considered to be within the ambit of the inventions disclosed herein to the extent that they fall within the scope of the appended claims.

What is claimed is:

1. A drain valve comprising:
   a housing defining a drain conduit for the passage of fluids to be drained, said drain conduit having a first rim defining an inlet into the drain conduit opposite a second rim defining an outlet so as to form an internal flow passage between the inlet and the outlet, the first rim being an uppermost surface of the housing;
   a raised strut with one end connected to the housing at the first rim;
   a post coupled to the raised strut, wherein the raised strut depends radially inwardly from the housing towards the post and the raised strut extends above the first rim;
   a first skirt valve extending radially outwardly from the post and toward the second rim; and
   a first valve seat extending from an inner surface of said housing wherein a radially distal portion of said first skirt valve sits against said first valve seat.

2. The drain valve of claim 1, further comprising a sealing annular sleeve comprising a plurality of longitudinally spaced apart projections extending radially inward and a plurality of longitudinally spaced apart sealing flanges extending radially outward, wherein said projections are received in corresponding depressions formed on an outer surface of the housing.

3. The drain valve of claim 1, further comprising at least one clip moveable from a first position to a second position, wherein when in the first position the entirety of said clip does not extend radially outward beyond the first rim and wherein when in the second position at least a portion of the clip extends radially outward beyond the first rim.

4. The drain valve of claim 3, wherein the clip is hingedly mounted to the housing.

5. The drain valve of claim 3, wherein the clip comprises an elbow formation part way along its length.

6. The drain valve of claim 1, wherein the post is hollow defining a first conduit, wherein at least a portion of the raised strut is hollow defining a second conduit, wherein a strut outlet is formed on the strut, wherein the first conduit is in communication with the second conduit, wherein a flow path is defined along the first conduit and the second conduit extending to the raised strut outlet, such that a flow through the first conduit flows through the second conduit and exits the raised strut through said strut outlet.

7. The drain valve of claim 6, further comprising a first float valve member in said first conduit, wherein a first float valve seat is defined in the first conduit, and wherein when the first float valve member sits on the first float valve seat it blocks flow through the first conduit.

8. The drain valve of claim 7, further comprising a second float valve member in said first conduit, wherein a second float valve seat is defined in the first conduit, and wherein when the second float valve member sits on the second float valve seat it blocks flow through the first conduit.

9. The drain valve of claim 1, further comprising:
a second skirt valve extending radially outwardly from the post and toward the second rim, said second skirt valve being longitudinally spaced apart from said first skirt valve; and
a second valve seat extending from the inner surface of said housing wherein a radially distal portion of said second skirt valve sits against said second valve seat.

10. The drain valve of claim 9, wherein the second skirt valve has the same diameter and the same geometry as the first skirt valve.

11. The drain valve of claim 1, further comprising at least one barb extending outward from the housing, wherein said at least one barb comprises a first portion extending outward of the housing from the second rim in a direction toward the first rim and a second portion extending from the first portion and in a direction radially outward and toward the first rim.

12. The drain valve of claim 1, wherein the post comprises a first portion and a second portion separate from the first portion and coupled to the first portion and wherein the housing comprises a first portion and a second portion separate from the housing first portion coupled to the housing first portion, wherein the first skirt valve extends from the first post portion and wherein the first valve seat is formed on an inner surface of the first housing portion, and wherein the drain valve comprises a second skirt valve extending from the post second portion and a second valve seat formed on an inner surface of the housing second portion, wherein a distal portion of said second skirt valve sits on said second valve seat.

13. The drain valve of claim 12, wherein the second skirt valve has the same diameter and the same geometry and the first skirt valve.

14. The drain valve of claim 1, wherein at least one of the skirt valve, the post, or the housing comprises a material that glows in the dark.

15. The drain valve of claim 1, wherein at least a portion of the skirt valve changes color to a color indicating that the drain valve has to be serviced or replaced.

16. The drain valve of claim 1, wherein at least a portion of said first skirt valve is coated with a hydrophobic coating.

17. The drain valve of claim 1, wherein a majority of the raised strut is outside of the internal flow passage.

18. The drain valve of claim 1, wherein the raised strut is curved or arched in form.

19. The drain valve of claim 18, wherein the raised strut has radially inner and outer ends and the raised strut is curved through an angle of between 60° and 90° between said radially inner and outer ends.

20. The drain valve of claim 1, wherein the raised strut comprises an engagement formation for engagement with the post such that the post is suspended from the raised strut.

21. The drain valve of claim 1, further comprising a cover member having a plurality of flow openings therein, the cover member arranged to cover the inlet of the internal flow passage, wherein the cover member comprises a cut-out to accommodate the raised strut therein.

22. The drain valve of claim 1, wherein the housing has a peripheral wall and a sealing gasket located about the peripheral wall for contact with an interior of a drain opening, wherein the housing includes one or more retaining members arranged to depend radially outwardly of the housing so as to retain the housing within the drain opening.

23. The drain valve of claim 22, wherein the one or more retaining members comprises a resilient barb formation.

24. The drain valve of claim 1, wherein the raised strut comprises a hollow connector end connected to an upper end of the post, wherein the post is hollow so as to define a gas flow passage in communication with the raised strut.

25. A drain valve comprising:
a housing defining a drain conduit for the passage of fluids to be drained, said drain conduit having a first rim defining an inlet into the drain conduit opposite a second rim defining an outlet so as to form an internal flow passage between the inlet and the outlet;
a raised strut extending from the housing;
a post coupled to the raised strut, wherein the raised strut depends radially inwardly from the housing towards the post and at least a radially inwardly depending portion of the raised strut extends above the first rim such that said portion of the raised strut does not obstruct the flow area at the inlet into the drain conduit;
a first skirt valve extending radially outwardly from the post and toward the second rim; and
a first valve seat extending from an inner surface of said housing wherein a radially distal portion of said first skirt valve sits against said first valve seat, wherein the housing surrounds a central axis and the raised strut is obliquely angled relative to the axis.

26. A drain valve comprising:
a housing defining a drain conduit for the passage of fluids to be drained, said drain conduit having a first rim defining an inlet into the drain conduit opposite a second rim defining an outlet so as to form an internal flow passage between the inlet and the outlet;
a raised strut extending from the housing;
a post coupled to the raised strut, wherein the raised strut depends radially inwardly from the housing towards the post and at least a radially inwardly depending portion of the raised strut extends above the first rim such that said portion of the raised strut does not obstruct the flow area at the inlet into the drain conduit;
a first skirt valve extending radially outwardly from the post and toward the second rim; and
a first valve seat extending from an inner surface of said housing wherein a radially distal portion of said first skirt valve sits against said first valve seat, wherein at least a portion of the raised strut is hollow and the hollow portion comprises an outlet so as to define a flow passage through the interior of the raised strut.

* * * * *